United States Patent
Zertuche

(10) Patent No.: US 11,068,651 B2
(45) Date of Patent: *Jul. 20, 2021

(54) GAP ANALYSIS ON ASSESSMENT DATA ANALYSIS PLATFORM

(71) Applicant: Estia, Inc., San Antonio, TX (US)

(72) Inventor: Alejandra Zertuche, San Antonio, TX (US)

(73) Assignee: Estia, inc., San Antonio, TX (US)

( * ) Notice: Subject to any disclaimer, the term of this patent is extended or adjusted under 35 U.S.C. 154(b) by 153 days.

This patent is subject to a terminal disclaimer.

(21) Appl. No.: 16/008,179

(22) Filed: Jun. 14, 2018

(65) Prior Publication Data

US 2018/0365782 A1 Dec. 20, 2018

Related U.S. Application Data

(60) Provisional application No. 62/520,366, filed on Jun. 15, 2017.

(51) Int. Cl.
*G06F 40/20* (2020.01)
*G09B 7/00* (2006.01)
(Continued)

(52) U.S. Cl.
CPC .............. *G06F 40/20* (2020.01); *G06F 40/40* (2020.01); *G06Q 50/20* (2013.01); *G09B 7/00* (2013.01);
(Continued)

(58) Field of Classification Search
CPC ... G09B 7/00; G09B 7/02; G09B 7/07; G09B 7/10; G06F 40/40; G06F 40/20; G06F 3/04842; G06F 3/04847; G06Q 50/20
See application file for complete search history.

(56) References Cited

U.S. PATENT DOCUMENTS

2014/0188574 A1* 7/2014 Luca ................ G06Q 10/06393
705/7.39
2015/0187225 A1* 7/2015 Worsley .................. G09B 7/07
434/178

(Continued)

OTHER PUBLICATIONS

U.S. Appl. No. 16/008,140, filed Jun. 14, 2018, Alejandra Zertuche.

(Continued)

*Primary Examiner* — Malina D. Blaise
(74) *Attorney, Agent, or Firm* — Miguel Villarreal, Jr.; Gunn, Lee & Cave, P.C.

(57) ABSTRACT

A platform is described for analyzing assessment data, including correlating assessment data with learning outcome data, and presenting analysis results through one or more interactive dashboards. A course syllabus and/or other course described information is analyzed to identify expected target outcomes to be achieved by students of the course, and to identify a relative weight of each of the various target outcomes based on their coverage in the syllabus. Assessment data describing a digitally administered assessment is analyzed to identify the categories that are assessed in the various questions of the test. The target outcomes are compared to the assessed categories to determine the extent to which the assessment is assessing each of the target outcomes, the degree of correspondence between the distribution of assessed categories and the distribution of target outcomes, and whether any gaps are present indicating that certain target outcomes are going unassessed or are insufficiently assessed.

16 Claims, 12 Drawing Sheets

(51) Int. Cl.
*G06F 40/40* (2020.01)
*G09B 7/02* (2006.01)
*G09B 7/07* (2006.01)
*G09B 7/10* (2006.01)
*G06Q 50/20* (2012.01)
*G06F 3/0484* (2013.01)

(52) U.S. Cl.
CPC ............... *G09B 7/02* (2013.01); *G09B 7/07* (2013.01); *G09B 7/10* (2013.01); *G06F 3/04842* (2013.01); *G06F 3/04847* (2013.01)

(56) References Cited

U.S. PATENT DOCUMENTS

| | | | | |
|---|---|---|---|---|
| 2015/0269244 | A1* | 9/2015 | Qamar | G06Q 10/06398 705/7.42 |
| 2015/0279426 | A1* | 10/2015 | Maurer | G11B 27/28 386/241 |
| 2015/0348433 | A1* | 12/2015 | Gatterbauer | G06Q 10/101 434/353 |
| 2016/0314699 | A1* | 10/2016 | Brinton | G09B 5/02 |
| 2017/0069216 | A1* | 3/2017 | Vaughan | A61B 5/00 |

OTHER PUBLICATIONS

U.S. Appl. No. 16/008,150, filed Jun. 14, 2018, Alejandra Zertuche.
International Search Report and Written Opinion for International Application No. PCT/US2018/037482, dated Sep. 17, 2018, 14 pages.

\* cited by examiner

GAP ANALYSIS ON ASSESSMENT DATA ANALYSIS PLATFORM

CROSS-REFERENCE TO RELATED APPLICATION

The present disclosure is related to, and claims priority to, U.S. Provisional Patent Application Ser. No. 62/520,366, titled "Outcome Correlation Analysis for Testing," which was filed on Jun. 15, 2017, and the entirety of which is incorporated by reference into the present disclosure.

BACKGROUND

Institutions and organizations, within an academic, educational, or other setting, which have strategic plans with key goals and which seek to continuously improve processes, are adopting a variety of software products in order to collect data in an electronic format. However, despite the adoption of these software products, the collection, integration, and analysis of the data to continuously improve processes is sometimes done manually, which is typically labor intensive and error-prone. Further, these previously available software products may not provide readily usable information or insights, which support evidence-based decision making, in a comprehensive, consistent, and easily understood format for the achievement of strategic plans and key goals. Moreover, a variety of software products are currently available to administer tests and/or other types of assessments for education, professional certification, licensing certification, and other purposes. Such products may be designed to address specific needs within an academic, educational, or other setting, and accordingly may not provide readily usable information for analysis or assessment, in a consistent and easily understood format.

SUMMARY

Implementations of the present disclosure are generally directed to mechanisms to create, measure, monitor, and/or evaluate key goals from strategic plans in educational and/or other environments. More particularly, implementations of the present disclosure are directed to the integration and analysis of data from diverse sources within a program, comparing the designed and intended curriculum mapping of educational outcomes to the taught, assessed, and/or learned curriculum mapping of educational outcomes in a course or set of courses, identifying gaps, redundancies and inefficiencies, and presenting this information and/or other information in one or more dynamically interactive graphic user interfaces (UIs), also described as dashboards. Implementations of the present disclosure are also directed to integrating the dashboard(s) with a system for creating and managing tickets including continuous quality improvement (CQI) tasks and observations to enable users of the dashboard(s) to generate tickets that are assigned to responsible individuals and tracked to monitor the progress of the responsible individuals in completing the tasks. The CQI tasks document and track data-based decisions and how they advance quality improvement efforts. Implementations of the present disclosure are also directed to integrating and analyzing the data from diverse academic assessment sources, and comparing the results of the analysis to various types of (e.g., external peer and national) data, to determine strengths, weaknesses, opportunities, and threats related to their program effectiveness, competitive programs, national standards, and academic accreditation standards of the various types of analyzed data. Such strengths, weaknesses, opportunities, and threats analysis and other implementations are described in more detail below.

In general, implementations of innovative aspects of the subject matter described in this specification can be embodied in a method that includes the following operations: receiving, by a platform, assessment data from an assessment service that digitally administers at least one assessment, the assessment data including category data describing at least one category associated with each respective question of the at least one assessment, the assessment data further including score data describing a plurality of scores each assigned based on a response of an individual to a question on the at least one assessment; receiving, by the platform, outcome data indicating at least one outcome associated with at least one course that includes the at least one assessment; analyzing, by the platform, the assessment data and the outcome data to determine analysis results, including comparing the outcome data to the category data to identify at least one gap in coverage of the outcome data by the at least one assessment; and presenting the analysis results, including the at least one identified gap, through at least one interactive dashboard provided by the platform.

These and other implementations can each optionally include one or more of the following innovative aspects: the operations further include normalizing, by the platform, the assessment data to provide a same range of scores for a plurality of questions described in the assessment data; the at least one gap identifies at least one question that is not associated with at least one category in the assessment data; the at least one gap identifies at least one outcome for which none of the questions on the at least one assessment is associated with a category corresponding to the at least one outcome; the at least one gap identifies a discrepancy between distribution weights of outcomes associated with a course compared to distribution weights of categories associated with at least one assessment included in the course; the operations further include receiving, by the platform, accreditation information describing one or more accreditation criteria; the operations further include comparing, by the platform, the accreditation information to the outcome data; the operations further include determining, by the platform, based on the comparing, the at least one gap that identifies at least one discrepancy between the one or more accreditation criteria and the at least one outcome; the operations further include generating, by the platform, at least one report that describes on or more accreditation criteria that are satisfied by the outcome data; the operations further include communicating, by the platform, the at least one report to an entity that provided the accreditation information; the outcome data includes a first set of metadata tags that describe the at least outcome for the at least one course; the category data includes a second set of metadata tags that describe the at least one category associated with questions included in the at least one assessment; analyzing the assessment data and the outcome data includes determining a mapping between each of the first set of metadata tags and one or more corresponding tags included in the second set of metadata tags; the outcome data includes at least one syllabus of the at least one course; and/or analyzing the outcome data includes performing a natural language analysis of at least one syllabus to determine the at least one outcome associated with the at least one course.

Other implementations of any of the above aspects include corresponding systems, apparatus, and/or computer programs that are configured to perform the actions of the method(s). The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that implementations in accordance with the present disclosure can include any combination of the aspects and features described herein. That is, implementations in accordance with the present disclosure are not limited to the combinations of aspects and features specifically described herein, but also include any other appropriate combinations of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
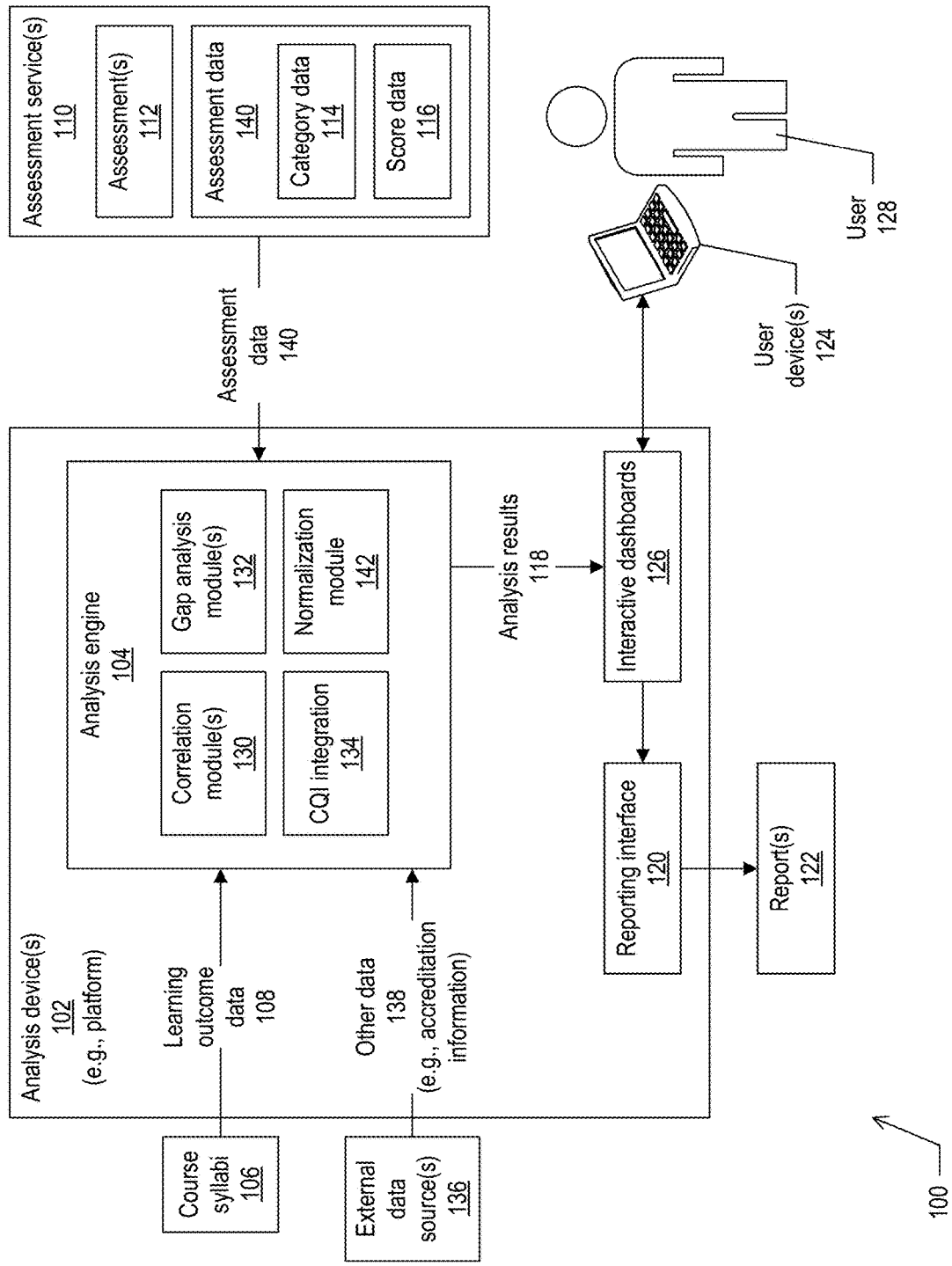
FIG. 1 depicts an example platform for assessment data analysis, according to implementations of the present disclosure.

Implementations of the present disclosure are directed to a platform for extracting, collecting, integrating, analyzing, and presenting assessment data from an academic environment and/or other types of environments. Implementations also provide for various interactive dashboards that provide data visualization for the results of the analysis, integrated with a system for creating and managing tickets comprising of CQI tasks and observations, and provide an automated process to monitor and evaluate academic assessment data against external criteria promulgated by an accreditation organization or other type of entity. Implementations also provide an automated process to evaluate institutions or organizations against external criteria promulgated by an accreditation organization or other type of entity.

Academic institutions such as universities, colleges, professional schools, trade schools, and/or other types of organizations perform various types of assessments of their students. Such assessments generate a large amount of data that, using previously available solutions, was stored in various disparate sources with differing formats. Moreover, institutions have traditionally lacked the process and tools needed to integrate, analyze and understand the data, identify strengths, weaknesses, opportunities, and threats related to their program effectiveness, competitive programs, national standards, and academic accreditation standards, identify action items to address weaknesses, opportunities and threats in the data or to document strengths, recognize trends exhibited by the data, and so forth. The implementations described herein provide a platform to address the shortcomings in previously available solutions and, in some cases, provide a solution for extraction, collecting, integration, and analysis of assessment data that was previously unavailable. The platform can integrate, analyze, and assist users in understanding the data, and identify areas of improvement.

As used herein, an assessment describes any process by which an individual understanding and/or knowledge (e.g., student) is evaluated according to one or more objective or subjective metrics (e.g., program learning goals). An assessment can be one or more of the following: a survey, an assignment, a quiz, a test, an observation, a rubric, a vocational assessment, a clinical evaluation, and/or other appropriate type of assessment. An assessment can produce a result (e.g., a score or grade) that provides a gauge of the assessed individual's proficiency with respect to one or more academic outcome. An assessment can include any number of items, also described herein as questions.

The platform described herein integrates and analyzes data from one or more assessment services, administrated and/or recorded via a variety of software products, the data including score data for the assessment of student achievement of learning outcomes, course objectives, program outcomes and, national learning outcomes. In some examples, an assessment can be administered using software, and the score data can be generated and stored through operations of the software, based on the students' input to the software during the assessment. In some examples, an assessment can be administered at least partly outside of a software environment, such as a practical assessment to determine the student's particular level of proficiency at a skill or craft such as welding, driving, public speaking, musical performance, and so forth. In such examples, the score data can be entered to the software by an instructor or other user. The grading of observations can be recorded in the software through any suitable rubric. The platform provides interactive dashboards to present the results of the data integration and/or analysis, including metrics such as key performance indicators (KPIs) that are relevant to the particular outcomes of an institution and/or educator administrating the assessments. Such outcomes can be learning outcomes, requirements and/or standards provided by an accreditation organization, or other type of entity, that determines the institution's quality and/or whether the institution is to be accredited.

In some implementations, the assessment service(s) include digital assessment services such as ExamSoft™. The platform can extract, integrate, and/or analyze data provided by any suitable assessment service. The data received from an assessment service can include the questions asked on assessments, type of question (e.g., multiple choice, true/false, fill in the blank, essay, rubric etc.), possible answers to questions, number of possible answers, and so forth. The data can also include psychometric data regarding the questions asked on assessments, such as difficulty index—the percent of students who answered the question correctly, point biserial correlation which measures the reliability of assessment questions, KR-20 which measures the reliability of inter-question consistency, how many students selected each possible answer, how many points each student got for each answer, and so forth. The data can also include category data describing the various categories that have been associated with each question, which can also be described as the labeling of a question. Category data is described further below, and can include a learning outcome, learning objective, topic or/and subject of the question (to any suitable degree of specificity), a course and/or assessment associated with the question, and so forth. Questions may be associated with any appropriate number of categories. In some instances, a question may have multiple categories with different levels of categorization. For example, a question can have one or more primary categories, secondary categories, tertiary categories, and so forth.

In some implementations, the analysis of the data may include normalization of the data received from assessment services. Such normalization can include normalizing a scale of possible scores for the questions, such as normalizing scores to a scale from 0 to 1 where 0 is no credit and 1 is full credit for a question. For each assessed individual, also described herein as a student, a determination may be made of the overall weighted percentage of correct questions on an assessment, as a sum of the scale for each question that is weighted according to the normalization. For example, a determination may be made that a particular student earned, on a particular assessment, 82.5% of the credit available for the questions on the assessment. Such normalization makes it possible to compare the performance of students on different assessments that may have different numbers of questions and/or different question weight contribution to the total points available on the assessment. The normalization also enables comparing of student performance between different students in the same or different courses, and comparison of student performance over time. Normalization can be performed across assessments and across questions in an assessment, such that a normalized scale of credit is applied to questions that may be directed to different categories in one or more assessments.

In some implementations, different questions on an assessment can be weighted differently based on the difficulty of the questions and/or other criteria. The weights may be taken into account when determining a student's score on a particular assessment, or across multiple assessments administered in a course. For example, a student's score can be a weighted total or weighted average of the scores on the various questions, weighted according to the weights assigned to the different questions. Such weighting may be determined based on historical data regarding answers to questions, where such historical data is analyzed to determine the difficulty of a question. For example, hard questions may be weighted at 3 points, medium questions weighted at 2 points, and easy questions weighted at 1 point. The weight may be applied as a coefficient when determining the overall score of a student on an assessment and/or in a course. In some implementations, the normalization described herein may be performed instead of weighting different questions. In some implementations, questions may be normalized as described herein, and weights may be further applied to the normalized questions to provide different weights according to category or other considerations.

A question on an assessment can be any appropriate portion of an assessment that assesses the student with respect to one or more particular pieces of knowledge and/or skills. For example, a written assessment (e.g., digitally administered or otherwise) can include 20 multiple choice questions regarding European history or some other topic. As another example, an orally administered or practical assessment may include 5 questions that are areas of assessment, such as assessing a medical student with respect to five different areas where clinical proficiency is desired. A question is also described herein as an item, and may include any suitable instance in which a student is assessed with respect to a particular piece of knowledge or skill, with any suitable degree of specificity. For example, an item may be a practical determination of skill, such as a determination of a student's ability to weld or perform other physical activities outside of, or in addition to, a written examination scenario.

Each question can be associated with any suitable number of categories. In some instances, categories can be categories from the Bloom's taxonomy or any other cognitive dimensions, as described further below. A category of a question can also indicate the assessment that includes the question, the course in which the question was administered as part of an assessment, a professor that administered the course, assessment, and/or question, and so forth. A category can also indicate a desired learning outcome for the question, a topic or subject of the question, and so forth. The platform can analyze the data received from the assessment service(s) to identify questions that are not associated with categories, and/or that are associated with too few or too many categories. For example, a question may be associated with a category identifying the course, but may lack additional categories indicating a learning outcome, topic, and/or subject of the question. Such shortcomings of the received data may be flagged by the platform, and CQI tasks (described below) may be generated, with a direct web link to the questions in the assessment system (e.g., ExamSoft™), to prompt a responsible individual (e.g., the professor teaching the course) to provide/label the missing categories for the flagged questions.

The received data can be integrated and analyzed according to various criteria. For example, data can be aggregated for a course, to include the assessments administered in the course. Data can be integrated and analyzed for a course for a particular year, or across multiple years. Data can be integrated and analyzed across multiple courses, such as across all the courses administered as part of an educational program (e.g., pharmacy school courses administered in a cohort, the first year or in all years of the program).

In some implementations, the received input data from assessment services may be modified as part of a pre-processing phase prior to subsequent analysis. For example, data can be modified to normalize and/or otherwise alter the categories of the questions described in the data. In some instances, incoming category data can be described as a hierarchy of categories, arranged in a tree structure with a top-level category, various subcategories under the top-level category, various sub-subcategories under each subcategory, and so forth. Such a hierarchy can be flatted, such that each category is assigned a name that describes its original hierarchical position (e.g., a full path of a category within a hierarchy). Modification of category data can also include normalization to provide consistency in category name and identification.

In some implementations, the platform can also receive course information that describes the desired or targeted learning outcomes for a course. Such course information can be retrieved from a course syllabus or other course description. In some instances, course information can be input to the platform by a professor or other individual associated with the course.

The course information, indicating learning outcomes for a course, can be correlated with the score data and category data for the questions included in the assessments administered as part of the course. Such correlation can produce output data that indicates the extent to which a course is actually administering assessments that evaluate students with respect to the desired learning outcomes. For example, an introductory calculus course may have learning outcomes indicating that students of the course are to learn how to evaluate integrals, evaluate derivatives, and solve simple differential equations. If the assessments administered during the course have questions associated with learning outcome categories for integrals and derivatives, but lack (or have few) questions associated with differential equation learning outcomes, the particular course may be flagged as having assessments that do not adequately correspond to the desired learning outcomes. Learning outcomes can be an aggregate of multiple courses and learning outcomes over a period of semesters or years. So, while a learning outcome for a particular course might be achieved, the aggregate learning outcome might still fail in some instances. For example, an introductory calculus course learning outcome might be achieved, but it could be part of an aggregate for a learning outcome of math needed for civil engineering learning outcome, and that learning outcome might fail even though the more specific learning outcome may have been achieved.

The correlation can also produce output data that indicates how well students are performing with respect to the learning outcomes and/or any other objective of a course, based on the scores the students earn on questions that have categories associated with the learning outcomes and/or any other objective. For example, following the calculus course example above, if students in the course are achieving adequate scores on questions that have categories for integrals and derivatives, but are achieving below-threshold scores on questions that have categories for differential equations, a determination may be made that the course is inadequately teaching students about differential equations, and the professor may be presented with an action item, a CQI tasks, to improve their performance in that particular learning outcome. Correlation may also take into account overall student performance, question quality determinations, and/or other factors that are determined based on the analysis, as described further below.

The platform provides various interactive dashboards as UIs that a user can employ to view the results of the analysis and/or perform actions associated with the assessment data and analysis results. Such dashboards are described as interactive and/or dynamic, given that the dashboards can alter their appearance dynamically, in real time, in response to actions performed by the user within the dashboard to specify thresholds, define data filters, and/or otherwise request alteration of the data visualization.

Figure 4:
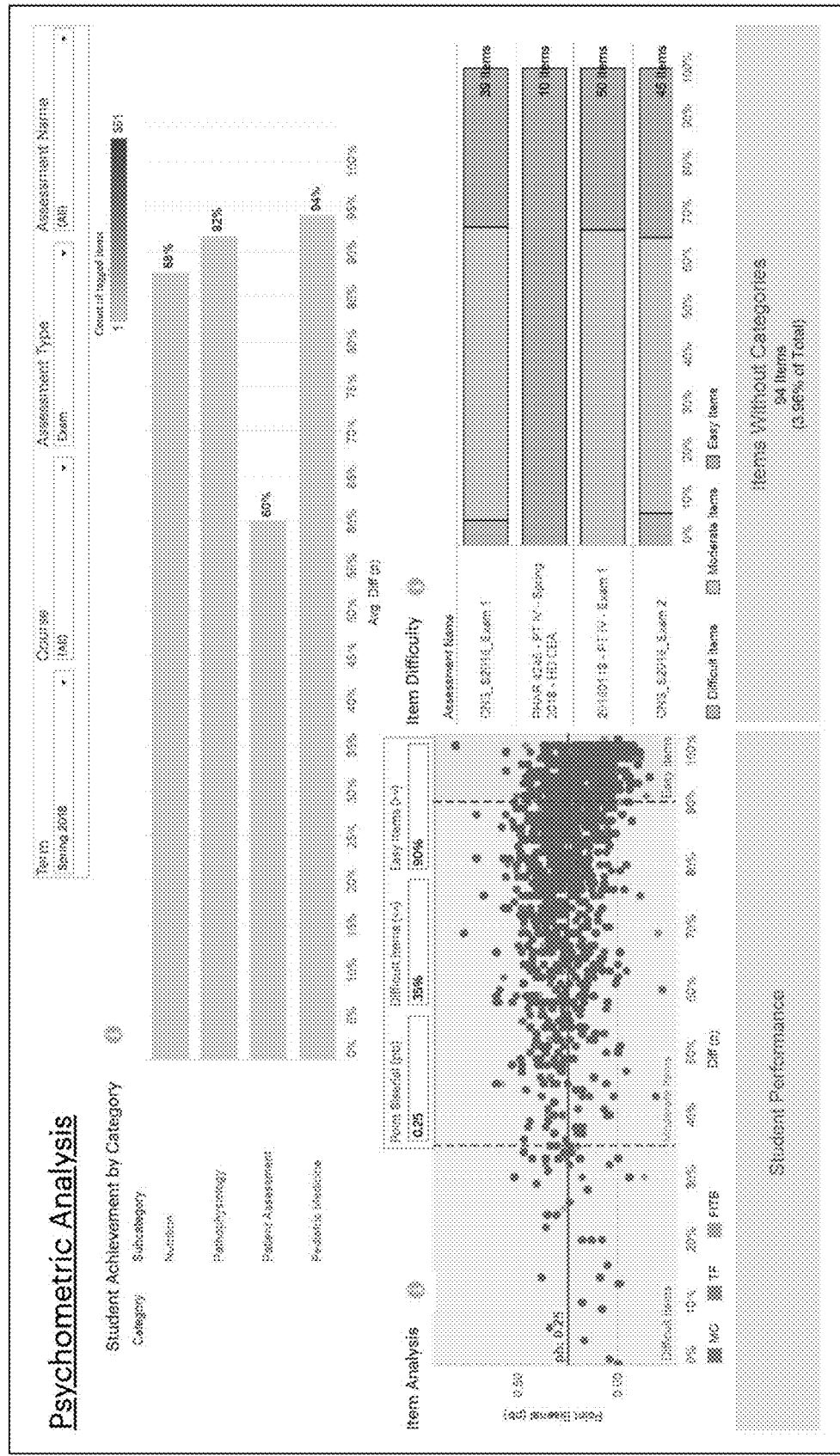
FIGS. 4-10 depict examples of dashboards that present assessment information, correlation analysis results, and/or other information, according to implementations of the present disclosure.

In some implementations, the dashboards provided by the platform includes a course effectiveness dashboard. The course effectiveness dashboard may present a scatter plot showing psychometric data regarding a particular assessment (e.g., exam), and/or a scatter plot for all the assessments administered in a particular course. The course and/or assessment may be selected from drop-down menus and/or other suitable UI controls included on the dashboard. In some implementations, the scatter plot may present a series of points each corresponding to a question administered on an assessment. The points may be plotted on the scatter plot, with the X-axis indicating the percentage of students who answered the question correctly, and the Y-axis indicating the point biserial of the question. Further, the course effectiveness dashboard may present the percent of difficult, intermediate, and/or easy questions per assessment and the student performance on categories associated with the questions. An example scatter plot is shown in FIG. 4.

In some implementations, the calculation of the point biserial for a question includes designating the two groups of students, including an upper group of students (e.g., the upper 27%) and a lower group of students (e.g., the lower 27%). A degree of correlation is then determined between the two groups, such as a comparison of the number of students in the upper group who answered the question correctly versus the number of students in the lower group who answered the question correctly. The point biserial for a question indicates the amount of positive, or negative correlation between the performance of the two groups on the particular question. A quality of the question may be inferred based on its point biserial. For example, if the students who answered the question correctly are mostly the students who performed well on the assessment in general (e.g., the upper group), and the students who answered the question incorrectly are mostly the students who did not perform well (e.g., the lower group), then the question can be inferred as being a good question. If the question was answered correctly by a similar or same proportion of both groups of students, the question may be designated a low-quality question, given that both groups of students were answering the question randomly. A low-quality question may have a point biserial that is low (e.g., negative), compared to a high-quality question that has a high (e.g., positive) point biserial.

The scatter plot may use the two metrics, percentage of students answering correctly (e.g., on the X-axis) and point biserial (e.g., on the Y-axis), to divide the questions into four quadrants. The four quadrants may be labeled with quality indicators such as poor, marginal, good, and excellent, with poor questions in the lower left quadrant of the scatter plot (e.g., with low percentage of students answering correctly and low point biserial), marginal questions in the lower right quadrant (e.g., with high percentage of students answering correctly and low point biserial), good questions in the upper left quadrant (e.g., with a low percentage of students answering correctly and a high point biserial), and excellent questions in the upper right quadrant (e.g., with a high percentage of students answering correctly and a high point biserial).

In some implementations, the different quality-designated questions may be presented in the scatter plots as dots of different colors to indicate quality, such as red dots indicating poor quality questions. In some implementations, the presentation of the dots for the questions may have different shapes, colors, opacities, and/or other display characteristics based on other criteria of the questions, which may include categories of the questions. For example, the dots for questions from one assessment may be presented differently compared to dots for questions from another assessment.

In some implementations, the user may interact with the course effectiveness dashboard and specify the point biserial threshold that separates the lower portion of the scatter plot from the upper portion, and/or the percentage correct threshold that separates the left portion of the scatter plot from the right portion. For example, the left-right threshold may be set at 90%, and the point biserial (top-bottom) threshold may be set at 0.15. Such specification of point biserial may be made to allow even minor improvement that is to be identified and acted upon, and/or to achieve a goal of greater variation.

The scatter plot lets a professor or other user evaluate effectiveness of questions reliability to measure student understanding and knowledge. The scatter plot also lets the user readily identify those questions that are of low quality and that may need to be reviewed and revised. In some implementations, the user can click on a particular dot that corresponds to a question, and the question may be presented within a pop-up dialog or otherwise displayed in a dashboard (e.g., the question itself and possible answers). The dashboard may also display more detailed psychometric data regarding the question, such as the number of students who answered correctly, incorrectly, and/or with partial credit, the distribution of selected answers (e.g., correct and incorrect), the particular students who answered correctly or incorrectly, and so forth. The dashboard can also present the history of answers to this question on various exams in a period of time, as well as information regarding the assessments that include the selected question.

Through the dashboard, a user can view the distribution of questions for the assessment, and select particular questions to be removed and/or edited. In some implementations, the question can be edited or removed through the dashboard itself and/or the user is provided with a link to the system that stores the question. Editing the question can include changing the wording of the question, the wording of the possible answers, adding or removing possible answers, and so forth.

The dashboard can include drop-down menus and/or other selection controls that let the user specify various filters and/or subsets of the data to be displayed in the scatter plot. For example, the user can specify a scatter plot be shown with questions that are associated with a particular category, such as a learning outcome and/or Bloom's taxonomy category. As another example, the user can specify that a scatter plot be shown with questions that are included on one or more particular assessments, e.g., for which the category includes one of a selected set of assessments (e.g., final exam, midterm exam, quiz number 3, etc.).

In some implementations, the dashboard allows the user to graphically select a set of questions by drawing a box within the scatter plot. The dashboard can then, in response to a user command, generate a report (e.g., spreadsheet) that describes the selected questions in detail, including the psychometric data of the questions (e.g., point biserial and/or percentage of students who answered the question correctly), categories associated with the questions, and so forth. The report and/or dashboard can also show the distribution of categories associated with the selected questions, such as the learning outcomes associated with the selected questions. For example, the user can draw a box that approximately corresponds to the upper right quadrant in the scatter plot, and the dashboard (and/or generated report) can display the learning outcome categories that are associated with the selected (e.g., excellent quality) questions.

The dashboard may also provide other data visualizations, including trend data showing the variation in questions of particular quality designations over time (e.g., from year to year as the course is taught). In this way, the dashboard enables a user to track the change in quality of questions on particular assessment(s), and/or in particular course(s). In some instances, the change in quality can include the system for comparing multiple assessment results, so that the difference among results (e.g., the delta) is highlighted and/or abstracted to a number/percentage improvement.

In some implementations, the course effectiveness dashboard includes features that display data for students in a particular course and/or program of courses. The dashboard can allow a user to readily identify students at risk for failing a course, for example students with a course average currently below a selected threshold (e.g., 70%) or students who are otherwise under-performing compared to other students. The dashboard can produce a report of such students in a particular course, including student names and/or ID numbers, their average scores, scores on particular assessments, which particular assessments the student has taken, and so forth. In some implementations, selecting (e.g., hovering over) the student in the dashboard causes the dashboard to display a distribution of scores for the selected student on the various assessments they have taken in a course and/or multiple courses.

In some implementations, the dashboard can apply a conditional (e.g., an if-case scenario) to identify students at risk of failing the course. For example, one exam may remain to be administered in the course, and certain students in the course may need to earn at least a minimum score on the exam to achieve an overall passing grade in the course. Some students may be doing so poorly in the course, that no score they achieve on the last exam will let them pass the course. Students who are close to failing the course, and/or inevitably are to fail the course, can be designated by the dashboard as at-risk students. Other conditionals may specify different weights for the assessments in a course. For example, exams may be worth X % of the overall grade, quizzes may be worth Y %, and so forth. Such varying weights may be accounted for in identifying at-risk students.

In general, the dashboard can allow the user to readily identify problems, and/or potential problems, in a course, and allow the user to take actions to address the problems. Such problems (e.g., risk areas) may include, but are not limited to students at risk, low quality questions on assessments, questions that are missing categories and/or that have too few categories associated, learning outcomes that are not be covered in a course and/or that are showing below threshold scores (e.g., below 70%), and so forth. In this way, the dashboard can provide a visual indicator of system-evaluated problems, in which the system automatically determines information for further analysis, such as at-risk students and/or questions and answers that need improvement, and highlights or otherwise identifies those students or questions. It could also identify categories where learning outcomes are not being correctly assessed over time.

The dashboard can also show overall class performance on an assessment or in a course, the number of questions on an assessment or in a course, the minimum and/or maximum scores, the distribution of scores (e.g., in a histogram), and/or various metrics, such as a metric indicating the probability that students would obtain the same score if they took the assessment again (e.g., indicating a degree of randomness in the outcomes of the assessment).

In some implementations, the dashboards provided by the platform can also include an academic advising dashboard. The user of the academic advising dashboard (e.g., a mentor) can use the dashboard to view a list of mentees (e.g., students) who have been assigned to the mentor, by entering the mapping of mentors to mentees in the UI, for mentoring activities within the academic or other environment. The user can use the dashboard to view data regarding their mentees, such as an average score of each mentee on assessments administered in their various courses. Mentees at risk (e.g., determined as described above) of failing one or more courses can be flagged in the dashboard, to allow the mentor to provide help as appropriate. The user of the dashboard can select (e.g., click on, hover over) any of the mentees shown to view more detailed information regarding the selected mentee, such as a distribution of assessment scores for the student, and/or for a particular course, the score that the selected student earned on each exam, how the student is performing with respect to learning outcomes, how the student is performance compared to class performance (e.g., whether they are below class average or above class average), and so forth. For example, the class performance on a particular exam can be compared to the selected student's performance, and the user can perform an action (e.g., hover over) in the dashboard to prompt the dashboard to display more detail regarding the relative performance. For example, the additional detail may indicate that the class performance is 65% for an assessment with one question, and the particular student answered the question incorrectly, such that the difference between the class performance and the student's performance is −65%. In general, questions can be weighted differently, such that the overall score (e.g., for an individual student or the class) is a weighted average.

The academic advising dashboard and/or other dashboards can show question data that is filtered according to categories, such as questions that are associated with particular learning outcomes and/or categories of the Bloom's taxonomy. Such filtering may help the user identify those students that are having problems with particular types of questions that are associated with particular categories. In some instances, such filtering may also help identify difficulties experienced by students within particular groups, such as students with autism spectrum disorder (ASD). For example, the system could provide insights into questions that might be tagged as generally more difficult for ASD students.

In some implementations, the academic advising dashboard allows the user to enter information to memorialize various interactions between the mentor and their mentees, such as meetings, counseling sessions, the outcomes of such, and so forth. The academic advising dashboard can also enable the user to create CQI tasks for actions (e.g., agreed on between mentor and mentee) to be taken to improve mentee performance, with respect to career development, professional certification attainment, and/or other goals.

In some implementations, the dashboards provided by the platform include a student dashboard that a particular student can log into to view information regarding their performance on various assessments, with respect to various learning outcomes, with respect to various categories, and so forth. The data may be displayed on the dashboard that compares the student's performance to that of their classmates, with classmate data anonymized and/or aggregated appropriately. The student dashboard can allow the logged in student to create their own CQI tasks to track action items to improve their performance.

In some implementations, the dashboards provided by the platform include an administrator dashboard that is usable by a program administrator who oversees multiple courses and/or multiple professors within a program. Accordingly, the administrator dashboard allows the user to view information regarding multiple courses and multiple professors, and determine how a program complies, overall, with accreditation standards. The dashboard can present information regarding compliance with accreditation standards in a particular year or other any other suitable period of time. The administrator dashboard can also allow the user to view information regarding the student population within the program (e.g., demographic breakdown and/or change in breakdown over time), compare the program to other similar programs by comparing the program to peer programs at other institutions or national performance, view comparison information over any suitable period of time, and so forth.

In some implementations, access to the various dashboards is controlled based on the role of the user requesting access, and permission levels associated with each dashboard. For example, access to information regarding a particular course on a course effectiveness dashboard can be restricted to the professor and/or teaching assistant associated with that course, as well as a program administrator or dean who has access to information for multiple courses. A professor may not be able to view information regarding a course that they are not associated with (e.g., that they do not teach). For their own course(s), a professor may use the course effectiveness dashboard to view the distribution of scores for assessment(s) administered in the course, and/or other information regarding student performance in the course. A department chairperson, program administrator, dean, and/or other individual responsible for overseeing multiple courses may use the course effectiveness dashboard to view information on the various courses that are within their responsibility. As described above, a particular student may use a student dashboard to view their own scores on assessments, and the dashboard may compare their scores to the (e.g., average, anonymized, and/or aggregated) scores of other students, and the student may not have access to other information regarding other students. Access control may be accomplished based on authentication of the user logging into the dashboard(s) and providing credentials that are verified to determine the access permissions of the particular user based on their role.

In some implementations, the platform includes, or provides an integration with, a CQI system. The CQI system is used to generate and track tickets, and each ticket can describe an issue to be addressed, problem to be solved or mitigated, and/or task or action to be performed. A CQI ticket may include information describing the issue, action(s) to be taken, and/or individual(s) who are responsible for addressing the issue by performing the action(s). The CQI ticket may also indicate the current status of the ticket, such as open, closed, pending, in process, and so forth. The CQI ticket may be edited by the responsible individual(s) to provide updates on the progress toward resolving the issue. In some implementations, the platform provides a CQI dashboard that can be used to create, view, update, close, and/or otherwise access CQI tickets. A CQI ticket is also described herein as a CQI task. The ticket can include original, current, and/or target metrics and states.

The various dashboards provided by the platform can be used to create and view CQI tasks associated with the data shown in the dashboard(s). The dashboard can be used to identify a problem, such as a low-quality question on an assessment, a question that does not have associated categories, at risk student(s), and so forth. A control on the dashboard can be used to display a dialog that lets the user add the details for a CQI ticket (e.g., description of the problem, action(s) to be taken, responsible individual(s), etc.). The dialog can include a submit button or other suitable control to request that the CQI ticket, including the entered information, be created. In some implementations, a screen shot of the dashboard can be attached to the CQI ticket to further illustrate the issue or problem being tracked. In some implementation, the CQI ticket or observation includes a link to the dashboard that displays the data at the time when the CQI ticket was created. Creation of the ticket causes an email or other appropriate notification to be sent to the responsible individual(s). The creator of the ticket may also be notified when the status and/or information in the ticket is changed. Attaching a screenshot of the dashboard to the ticket allows that screenshot to be compared to the dashboard after the issue has been resolved, and enables confirmation of the appropriate issue resolution. In some implementations, a dashboard can include a time-stamp filter to enable the user to indicate the data they want to see. For example, the filter may be used to view what the data presented in the dashboard looked like when the ticket was created or what the data looked like before closing the ticket. The dashboard can provide a link with a time-stamp to the dashboard view the user was interacting with when they requested the creation of the ticket. The user can follow the link to view the previous dashboard view, and to easily evaluate progress by comparing the previous view to a later view.

In some implementations, a dashboard displays a list of (e.g., currently open) CQI tickets that have been created from that dashboard. Clicking on one of the listed ticket causes display of the ticket, including its information and status, in the dashboard and/or in a pop-up dialog or other window. A user can close a ticket by changing its status and adding summary information describing the particular action(s) performed to resolve the problem. The user can also add a screenshot of a dashboard state after resolution, to further establish that the issue is resolved. CQI tickets can be viewed and sorted based on various criteria, such as the creating user, responsible individuals, status, categories associated with the tickets, the course, assessment, and/or question associated with the ticket, and so forth.

In some implementations, the platform can automatically create CQI tickets based on the application of rules to the data that is available in the platform. For example, a periodic batch process can execute to analyze question data for various assessments, and identify those questions that are not associated with any categories (or that are associated with too few categories and/or lack appropriate categories). For those questions that are found to be insufficient with respect to associated categories, have a low biserial value, and so forth, the process can automatically create a new CQI ticket that is assigned to a professor or other individual associated with the course in which the assessment is administered. Alternatively, the process can send a notification to the associated individual indicating the problem (e.g., missing categories) and prompting them to create a CQI ticket to address the problem. In some implementations, a problem identified through the automated data review process may prompt the creation of a CQI ticket if an associated CQI ticket is not already open for the problem. The CQI integration can track the timeliness and resolution of CQI tickets by storing due dates and/or expected resolution dates for CQI tickets, and notifying individuals if the due dates are imminent or have passed.

In some implementations, the platform provides features for gap analysis to identify gaps. For example, a curriculum of a program, including the learning outcomes associated with the various courses and/or assessments in the program, may be analyzed and compared to intended curriculum mapping of learning outcomes and accreditation requirements for an accreditation organization, and unmet accreditation requirements (e.g., gaps) in the program may be identified for investigation and resolution. Gap analysis can include extracting and integrating data for the various courses in a program, such as course syllabi and or assessments administered in the courses. The learning outcomes extracted from the syllabi, and/or the learning outcomes associated as categories with the questions in the various assessments, can be aggregated and compared to the intended curriculum mapping of learning outcomes and accreditation requirements. Intended curriculum mapping of learning outcomes and accreditation requirements that are not suitably covered by the aggregated learning outcomes of a course can be flagged as gaps in the course curriculum to be addressed by adding or modifying courses (e.g., adding new content to a course) and/or adding or modifying content on course material, and assessments in a course.

In some implementations, the accreditation requirement coverage and/or other information may be presented in a curriculum effective and/or gap analysis dashboard in the platform. The dashboard can also show information describing how students perform on learning outcomes associated with board exams or other licensing type exams that are relevant to the program. For example, the dashboard can show pass/fail rates for law students on a bar exam, for those students who graduated from a legal study program. The dashboard can also show student performance on accreditation requirements as well as learning outcomes. For example, the dashboard can include, for each student, an average score earned by the student on questions that are labeled with a learning outcome that corresponds to a particular accreditation requirement, for one or more accreditation requirements. Such association can be to varying degrees of specificity, according to the particular accreditation requirements. For example, student scores can be shown for accreditation requirements that are general (e.g., clinical evaluation) and/or accreditation requirements that are more specific (e.g., pediatric or orthopedic clinical evaluation).

The dashboard can also show the degree of coverage for each learning outcome and/or accreditation requirement based on how many courses, assessments, and/or questions are directed to the learning outcome and/or accreditation requirement. The dashboard can show the various CQI tickets that have been created to address any identified gaps in the curriculum with respect to the accreditation requirements or gaps on the intended curriculum mapping of learning outcomes.

Gap analysis can also include comparing a particular program's performance to other programs (e.g., comparable, peer programs at other institutions and/or national standards) with respect to the scores earned by students on assessments that are relevant to accreditation requirements and/or learning outcomes. Such a comparison may be made relative to external data that is received from an accreditation organization, and that is anonymized with respect to particular program and particular student. A comparison can also be made to student achievement or activities following graduation, such as job placement rates, average salaries, and so forth.

Traditionally, schools or other educational institutions have used static tools such as spreadsheets to track information internally, but such data tracking tends to be inconsistent and incomplete. These traditional techniques also fail to provide context and are not readily usable, given that the previously available tools are difficult to use, read, scattered, in an inconsistent format, difficult to access, and/or exhibit other shortcomings. Implementations provide an integrated platform and portal for entry and analysis of data, tracking learning outcomes for courses taught within a program. As described above, the platform also provides gap analysis to identify instances in which accreditation requirements are not be adequately satisfied by the learning outcomes covered in a particular program, enabling a program administrator to readily determine whether accreditation requirements are being met, and to easily create CQI tickets to prompt the filling of any identified gaps in the curriculum with respect to the accreditation requirements.

The platform receives data extracted from assessment service(s) (e.g., ExamSoft™), to identify courses, assessments administered in courses, and categories associated with the questions on the assessments, if any categories have been associated with the questions. Categories can include learning outcomes. The learning outcomes for a course can be compared to accreditation requirements for an accreditation organization, to ensure the program is complying with accreditation requirements.

The platform can provide for the automatic generation of reports and/or communication of the report(s) over one or more networks to an accreditation agency and/or other interested parties. As a particular example, the report can be communicated to the National Association of Boards of Pharmacy® (NABP®) to verify that the data demonstrates compliance with the Pharmacy Curriculum Outcomes Assessment® (PCOA®). Such report(s) can include data regarding compliance with accreditation requirements, compliance exhibits, proof of CQI tasks, improvement, tracking, and so forth. The report(s) can be requested through the UI of the platform.

In some implementations, the platform performs various operations for analyzing the expected outcome coverage and results for (e.g., digitally administered) assessments in an educational setting and/or other environments. In some implementations, a course syllabus and/or other course description information is analyzed to identify expected target outcomes (e.g., goals, objectives) to be achieved by students of the course, and to identify a relative weight of each of the various target outcomes based on their coverage in the syllabus. An assessment, such as a test, exam, or other (e.g., educational or professional) assessment, is analyzed to identify the categories that are assessed in the various questions and/or portions of the assessment. The target outcomes are compared to the categories to determine the extent to which the assessment is assessing each of the target outcomes, the degree of correspondence between the distribution of assessed categories and the distribution of syllabus-indicated target outcomes, and whether any syllabus-indicated target outcomes are not being assessed. Test results may also be correlated with the target outcomes to develop metrics for success/failure rate and/or rate change with regard to the various outcomes, for individual students as well as aggregate student populations.

In some implementations, the analysis may be performed with respect to an educational or academic environment, such that the course is an educational course taught to students within such an environment. The course may involve one or more tests that are administered electronically using any suitable electronic testing software. Implementations provide a report that includes metrics describing whether, and to what extent, the test(s) are assessing students with regard to categories that correspond to the target outcomes indicated by a course syllabus, such that the course is testing what it purports to teach. Such report(s) provide testing administrators or other educational professionals access to specific metrics regarding test coverage and student performance, and allows tests to be fine-tuned to target the particular educational outcomes advertised in a course syllabus.

Previously available software products for educational assessment and/or testing employ different data formats and/or fail to provide useful information for analyzing outcomes. For example, one tool may describe what an instructor is planning to teach in a course, without any usable metadata for automated analysis, whereas another tool may indicate how students are performing, and yet another describes what instructors are doing in their classrooms. These various tools may lack the capability to integrate with one another, making it difficult or impossible to close the assessment loop and determine how effectively a course plan has been executed. Implementations described herein provide an automated platform to assess course outcomes based on test information and other sources of information.

In some implementations, computer software and a database is provided for collecting, integrating, and analyzing student data before, during, and/or after the student(s) attend an academic program and/or other educational setting. The computer software operates to provide a predictive analysis that anticipates specific actions to continuously advance academic excellence in an educational setting or other academic environments. The computer software also provides data insights for real-time programmatic assessment and accreditation compliance in an educational setting or other academic environments.

In some implementations, the computer software (e.g., application(s)) described herein automatically integrate and analyze data from disparate key data systems in the field of education. In some instances, the computer software is provided on-line, such that the software is hosted and provided as a service, and can be described as software-as-a-service (SaaS). Some implementations provide a website featuring technology that enables users to automatically integrate and analyze data from disparate assessment systems in the field of education. The software also provides predictive analysis that anticipates specific actions to continuously advance academic excellence in the field of education. Implementations also provide a user interface (UI) featuring technology that enables users to conduct predictive analysis that anticipates specific actions to continuously improve an educational program's quality. The software can provide data insights needed for real-time programmatic assessment and accreditation compliance in the field of education. Some implementations provide a website that features technology that enables users to display proprietary data insights for real-time programmatic assessment and accreditation compliance in the field of education. Implementations also provide (e.g., on-line, non-downloadable) computer software that documents data-driven decisions to continuously advance academic excellence.

Implementations provide a process that automatically extracts, transforms, normalizes, and integrates data from key data sources. Implementations also provide a secured data warehouse that automatically stores and processes the extracted data to deliver meaningful data through interactive dashboards and/or an application programming interface (API). Moreover, implementations also include interactive dashboards that provide a view of academic assessment data (e.g., student-level data) and/or institutional data (e.g., operational performance data) for educational program improvement, accreditation compliance, and predictive analytics. Such dashboards can help institutions make better strategic decisions and improve its operations.

Institutional data can include, but is not limited to, data describing one or more of the following: student retention, student attrition, standardized survey responses, national examination grades, application/admissions data, and/or post-graduation data (e.g., job placement, alumni events, etc.).

Academic assessment data can include, but is not limited to, data describing one or more of the following: national examinations, admissions data, electronic assessments, academic infractions, attendance, simulation activities, co-curricula activities, clinical activities (e.g., clerkships, rotations, etc.), community service, board exams, and/or standardized exams.

In some implementations, the dashboards are included (e.g., embedded) in a UI that contains a Data-Driven Continuous Quality Improvement forms task tracking system that allows users to add real-time comments and/or additional insights related to a specific data view. In these forms, the users can create, update, and complete Continuous Quality Improvement (CQI) tasks. Creation of a CQI task can include one or more of the following.

When creating a CQI task, the user can add a data insight to interpret and communicate the data analysis of what is going on with a particular data view.

When creating a CQI task, the user can add a Data-Driven Decision, a quality improvement decision based on the data insights, and/or continuous data-based actions that lead to measurable quality improvements of academic degree programs.

When creating a CQI task, the user can specify the desired outcome of the Data-Driven Decision in quantitative terms in the goal field.

When creating a CQI task, the user can assign a CQI tasks to an assignee that is a professor, committee, or course.

When creating a CQI task, the user can set a date for re-evaluation and/or completion of the task.

When creating a CQI task, the user can label the CQI task with categories. Examples of categories include mission, institutional goals, strategic plan goals, accreditation standards, and so forth.

After a CQI task is submitted, the creator and assignor are sent a confirmation (e.g. email), and the data is sent to the database along with a screenshot of the data view. In some instances, the assignee can update and complete the CQI task. When updating the CQI Task, the assignee can specify the status, the success of the data driven decision and add a comment/insight.

When a CQI task is completed and/or closed, the assignee and creator are sent a confirmation (e.g. email). When closing and/or completing the CQI task, the data is sent to the database along with a screenshot of the data view. The assignee and creator can be sent a reminder (e.g., email) if the CQI is not closed and/or completed before the reevaluation/completion date. In some implementations, the system takes a screenshot of the data view and sends it to the database, if the CQI is not closed and/or completed before the reevaluation/completion date.

The creator can monitor the status of CQI Tasks. The CQI tasks can be reported by assigned labels to identify successful decisions before and after the Data Driven Decision. For example, a report can be generated that shows all the CQI tasks related to Standard 3 of the Accreditation Standards.

In some implementations, the UI includes forms to capture data that schools or other educational organizations would like to integrate with key data systems. These forms alleviate the need for schools themselves to keep track of institutional and/or academic data in the traditional manner (e.g., using spreadsheets, etc.). Example forms can be provided for curriculum map, co-curricula activities, academic infractions, mentor/mentee relationships, and so forth.

FIG. 1 depicts an example system 100 for assessment data analysis, according to implementations of the present disclosure. As shown in the example, the system 100 can include one or more analysis devices 102, which host and provide the assessment data analysis platform (also referred to as the platform). The analysis device(s) 102 can include any suitable number and type of computing device(s), and may include distributed computing device(s) (e.g., cloud computing server(s)). The analysis device(s) 102 may include an analysis engine 104 that performs the various types of analysis as described herein to generate analysis results 118. The analysis engine 104 may receive, as input, learning outcome data 108 generated based on an analysis and/or examination of one or more course syllabi 106, course description(s), and/or other information describing a course (e.g., a university class, training seminar, etc.). The outcome data 108 for a particular course may include one or more target learning outcomes that are purported to be taught within a course. The learning outcome data 108 may be associated with one or more courses. A target outcome may be particular to the type of course. For example, target outcomes for a beginning calculus course may include: learn how to determine a derivative, learn how to determine an integral, understand sequences and series, and so forth. As another example, target outcomes for a first aid course may include: learn how to perform CPR, learn how to treat a simple wound, learn how to treat hypothermia, and so forth. Outcome data 108 for a course may be specified, e.g., by an instructor, in at least one course syllabus 106. In some instances, the outcome data 108 may be determined through a natural language (NL) analysis or other type of analysis that is performed on the syllabus or other course materials. In some instances, the learning outcome data 108 may be entered, e.g., by a professor or other individual, through the UI provided by the platform. The entered data can be reflected in the dashboards hosted by the UI.

In some implementations, the outcome data 108 may indicate a weight for each outcome, describing how each target outcome is to be emphasized within a course. For example, a course may include target outcomes X, Y, and Z with equal weights of 33%, indicating that each outcome is to be taught for a substantially equal amount of time or emphasized substantially the same. As another example, a course may include target outcomes X, Y, and Z with weights 10%, 30%, and 60% respectively, indicating the different relative emphasis to be placed on each outcome during teaching of the course.

The analysis engine 104 may communicate, over one or more networks, with one or more assessment services 110. The assessment service 110 may be an online service and/or software application that provides educational or other types of test, and that may store and provide information regarding administered assessment(s) 112. In some implementations, the assessment service 110 is an electronic assessment (e.g., testing) software package, such as that provided by Exam-Soft™. The assessment service 110 may provide, to the analysis engine 104, assessment data 140 that includes category data 114 and score data 116. The category data 114 may identify one or more categories that are assessed by or otherwise associated with questions in each of the assessment(s) 112. For example, a particular assessment 112 for a calculus course may test derivatives, integrals, and so forth, such that a question may be tagged with a category of derivative, integral, etc. In some instances, the categories may be from the same set of outcomes as described in the outcome data, in instances where the category data 114 and outcome data 108 is normalized to describe topics (e.g., outcomes and categories) using a same set of possible topics. Alternatively, the categories may be described differently than the outcomes, such that the category data 114 is not normalized with the outcome data 108 in the assessment data 140 and/or outcome data 108 that is received by the platform. In such instances, the analysis engine 104 may perform a normalization of the input data prior to further analysis. Such normalization may include determining a mapping between outcomes and categories, and/or determining mappings between outcomes, categories, and a common set of topics that describe both outcomes and categories.

In some implementations, the category data 114 includes weights of various categories that are assessed by an assessment 112, as described above. For example, if a history test includes 20 questions, and 3 of the questions assess knowledge of the American Civil War, and 5 of the questions assess knowledge of the Reconstruction period of American history, the category data 114 may indicate that the test assesses the "American Civil War" category with a weight of 3/20, or 15%, and the test assesses the "Reconstruction" category with a weight of 5/20, or 25%. The category data 114 may be specified by a course instructor or other individual, and/or may be determined through a NL analysis or other type of analysis of the questions in one or more assessments 112.

In some implementations, the assessment service 110 may also provide score data 116 to the analysis engine 104. The score data 116 may describe, for each of one or more tests, the overall score(s) of student(s) on the test, as well as the scores(s) of student(s) on individual questions of the test. The assessment data 140 may also include a description of the assessment(s) 112 themselves, including the questions on each assessment, possible answers to each question, weights of the questions, and so forth. The assessment data 140 can also include other information, such as the course in which an assessment is administered, the date on which the assessment was (or is scheduled to be) administered, a professor and/or other individual(s) associated with the course, and so forth. Assessment data 140 can also include, for each question, psychometric data such as a point biserial, percentage of students who answered the question correctly, and/or other information as described above.

The outcome data 108 and the assessment data 140 may be analyzed by the analysis engine 104 to generate analysis results 118, as described above. Such analysis may include a gap analysis, such as comparing the outcome data 108 to the category data 114 to determine whether all the outcomes that the course purports to cover are actually being tested by categories in the assessment(s) 112 for the course. For those outcomes that have corresponding categories covered by the test(s), the assessment information may indicate whether the proportions or weights of the outcomes corresponds to the proportions or weights of the categories. For example, the analysis results 118 may indicate that a particular target outcome in the outcome data 108 for a course does not have any corresponding categories in the category data 114 for the assessment(s) 112 in that course. As another example, the analysis results 118 may indicate that the outcome data 108 lists, as target outcomes, A, B, and C, with weights 50%, 25%, and 25% respectively, whereas the category data 114 indicates that A is tested only with weight 20%, B is tested more heavily with weight 70%, and C is not tested at all.

The analysis results 118 may be presented through one or more interactive dashboards 126 as described herein, such as a course effectiveness dashboard, academic advising dashboard, administrator dashboard, student dashboard, CQI integration dashboard, gap analysis dashboard, and so forth. A user 128 may access the interactive dashboard(s) 126 using a user device 124 of any suitable type. As described above, in some instances, access to a dashboard 126 and/or analysis results 118 presented within a dashboard is limited to those users 128 who have permission to access the information, based on the user role. For example, a particular professor may be able to view data for their own course(s) but not for other course(s) taught by other professors. As another example, a student may be able to view data regarding their own performance, as compared to anonymized, aggregated data for other students, but may not be able to view data regarding the performance of other identified students.

In some implementations, the interactive dashboards 126 include control(s) that allow a user to request the generation of report(s) 122 that describe the analysis results 118. Such report(s) 122 can be generated through a reporting interface 120 that executes within the platform or elsewhere. The reporting interface 120 can output one or more reports 122. The report(s) 122 may be communicated to user device(s) 124 for presentation in a user interface (UI) on the user device(s) 124. The report(s) 122 may also be stored for future access. The report(s) 122 may include analysis results 118 in various forms, including but not limited to tabular data, graphs of various types, animated graphics, textual descriptions of assessment(s), and so forth. Examples of analysis results 118 shown in the dashboards 126 and/or provided through the reports 122 is described further with reference to FIGS. 4-10.

In some implementations, the analysis engine 104 includes one or more correlation module(s) 130 that perform an analysis to correlate outcome data 108 with assessment data 140. Such analysis can be performed to generate analysis results that include course effectiveness data, such as that presented through the course effectiveness dashboard, as described herein. The analysis engine 104 can also include gap analysis module(s) 132 that perform the gap analysis as described above. The gap analysis can produce analysis results 118 that describe gaps in a course curriculum compared to accreditation requirements. The accreditation requirements can be received as other data 138 from one or more external data sources 136, such as an accreditation organization. Other types of other data 138 may also be received and analyzed by the platform. The analysis engine 104 may also include a CQI integration module 134 to enable CQI tickets (tasks) to be created, updated, and tracked through the dashboards 126, as described above.

In some implementations, the analysis engine 104 includes a normalization module 142 to perform normalization operations as described herein to normalize the range of available credit to be consistent (e.g., a range from 0 to 1) across multiple questions that may each originally have different maximum score values. Normalization operations performed by the normalization module 142 as described further herein. Categories may also be normalized. For example, each school can have its own category structure and the platform can normalize the categories to a set of standardized categories that are applicable across data from multiple schools or other organizations. Normalization is further described with reference to FIG. 2C.

To assist an organization in meeting its accreditation requirements, or other types of requirements that may be imposed by external entities as described herein, the CQI integration module 134 can provide a ticketing system that tracks and presents information relative to accreditation requirements and/or that tracks and presents information at different points in time to track the organization's progress in meeting their accreditation requirements. For example, the user of the platform can view a dashboard that shows a particular data state, and use the ticket generation function of the dashboard to automatically generate a ticket that is tracked in the CQI system. The generated ticket can include a snapshot of the dashboard, or at least a portion of the dashboard, which shows the presented data that indicates the problem to be solved, e.g., the problem that is tracked through the ticket. On resolution of the ticket, the dashboard snapshot can be compared to a corresponding dashboard snapshot at a later time/date, to check whether the "problematic data" has been resolved, at least in part. For example, if the dashboard shows that a particular accreditation goal (or other goal) is not being met, a ticket can be generated that includes a snapshot of the dashboard illustrating the unmet goal. A later resolution of the ticket (e.g., closing the ticket) can include attaching, to the resolved ticket, a later snapshot of the same dashboard showing that the goal has been met. In some implementations, the user makes certain selections through the dashboard to generate the captured state of the dashboard, and those selections can also be captured and associated (or added to) the generated ticket, to enable the corresponding dashboard state to be later generated for comparison, based on the same user selections.

For example, the user of the platform can use the dashboard to create a ticket for a task to be performed, the ticket being tracked through the ticketing system. The ticket can also include a copy of the query that the user performed (e.g., the selections made by the user), in the dashboard, to instruct the dashboard to generate the particular dashboard state, which is added as a snapshot to the ticket. The snapshot (also described as a screenshot) of the dashboard is stored in the ticket, along with the user selections made to generate the captured state of the dashboard. When the ticket is closed, the platform can generate change information (e.g., a delta) that describes the change in the data from when the ticket was generated compared to the current state of the data, where the current state of the data is determined by running the same query (e.g., the user selections) that were previously used to generate the previous state. In this way, implementations provide a reliable comparison of previous data state to current data state, to enable tracking to determine whether a problem has been resolved, such as whether accreditation requirements or other goals have been achieved. The platform also can provide a feature to let the user view the previous state of the dashboard (e.g., when the ticket was created) in comparison to the current state, to visually examine how the data has changed over time.

The dashboard can also let the user request creation of a ticket that identifies a particular data point, such as a particular student, question, and/or other data element, that is to be addressed through resolution of the ticket. The platform can automatically generate a ticket to resolve the issue, based on the context of the data point(s) that have been identified by the user as problematic. The user can specify a deadline for resolution of the issue, in some instances, and/or a particular individual who is assigned to perform task(s) to resolve the issue.

The platform also enables a user to request that a report be generated that lists tasks that are being tracked through the ticketing system. The report can be requested to show tasks that have been completed (e.g., resolved) over a particular period of time, tasks that are not yet resolved, and/or tasks that are in some other status (e.g., open, pending, resolved, etc.). The report can also list tasks assigned to particular individual(s). The reporting system can accept a query from a user, specifying criteria for the generated report such as status, date/time range (e.g., date/time when the tickets were created or closed), assigned individual(s), and so forth. The generated report can include some or all of the data fields that are included in the ticket, and the query can indicate which data fields are to be presented as part of the report. For example, the query can indicate whether the dashboard screenshots are to be included in the report. The report can also include change information that indicates the previous value of the tracked data point (e.g., a particular exam score) compared to the current value of the tracked data point. For different tickets, different data points may be relevant to the particular issues being tracked by the tickets, and the change information can also reflect the different relevant data points. On closing a ticket, the system can attach the current dashboard screenshot showing the data state when the ticket is closed, to provide a comparison between the state when the ticket was opened and the corresponding state when the ticket was closed. In closing a ticket, the user can indicate whether the issue was resolved, how the issue was resolved (if resolved), why the issue was not resolved (if not resolved), progress made toward resolving the ticket, and/or other suitable information regarding the closing of the ticket. A follow-up ticket can also be created to describe additional tasks to be performed, the follow-up ticket associated with the original ticket and in some instances inheriting at least a portion of the information included in the original ticket (e.g., with respect to the issue to be resolved, responsible entities, and so forth).

Figure 2A:
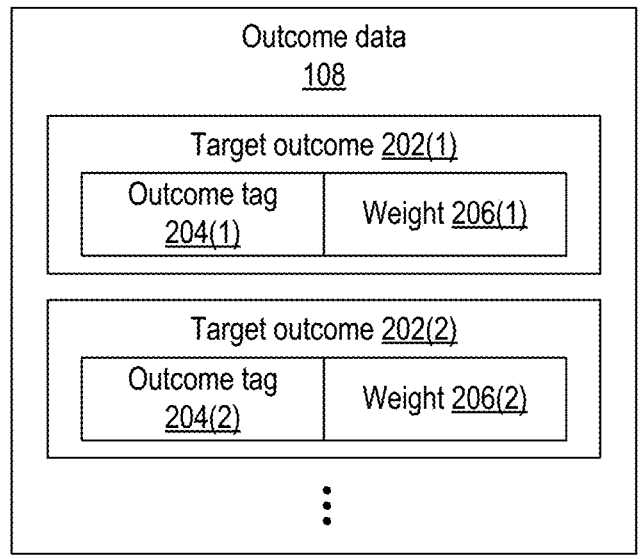
FIG. 2A depicts an example of outcome data that may be employed in outcome correlation analysis, according to implementations of the present disclosure.

FIG. 2A depicts an example of outcome data 108 that may be employed in outcome correlation analysis, according to implementations of the present disclosure. The outcome data 108 may describe a single course, or multiple courses. For each course, the outcome data 108 may include any appropriate number of target outcomes 202, also described as learning outcomes. A record for a target outcome 202 may include an outcome tag 204 that describes the outcome, and a weight 206 that describes the proportional importance or emphasis of that particular outcome among the total set of outcomes identified for the course.

Figure 2B:
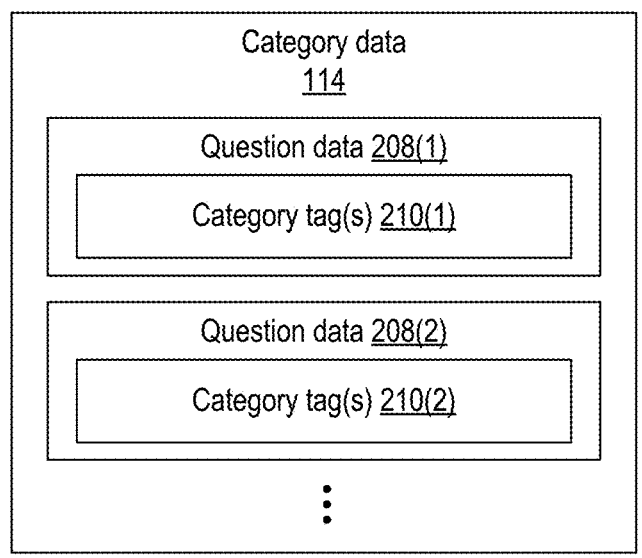
FIG. 2B depicts an example of category data that may be employed in outcome correlation analysis, according to implementations of the present disclosure.

FIG. 2B depicts an example of category data 114 that may be employed in outcome correlation analysis, according to implementations of the present disclosure. The category data 114 may describe categories assigned to questions of a single assessment 112, or multiple assessments 112. For each assessment, the category data 114 may include any suitable number of records of question data 208, each record associated with a particular question on the test. A question data record may include any number of category tags 210, identifying the particular categories that are assessed by that question on the test.

The outcome tags and categories tags may also be described as metadata tags, that provide a description of the identified outcomes and categories respectively.

In some instances, the analysis results are determined based on an analysis of input data from multiple sources that include course syllabi or other forms of course descriptions, as well as outcome from the testing service (e.g., electronic testing software package(s)). In some implementations, the analysis results describe whether, and how well, an assessment for a course is covering the various target outcomes that were indicated by the course syllabus or other course description materials. In this way, the platform can evaluate whether a course is assessing on what it purports to teach. Faculty may tag various questions in an assessment with categories when they write the assessment and/or upload it to the assessment service, by specifying a learning outcome, indicating a chapter from a textbook, or through use of other types of category tags that describe a topic, category, and/or purpose of a question. Such tags may be compared, by the analysis engine, to the course syllabus to assess a degree of correlation between syllabus and assessment. For example, if the syllabus claims that students are to be taught three target outcomes during a course, the assessment may determine whether the questions on the assessment actually targeted those three target outcomes, or if the assessment covered other categories instead. Gaps in the test coverage of the target outcomes, and/or other discrepancies between target outcomes and tested categories may be flagged as problems in the reports that are output from the system.

Figure 2C:
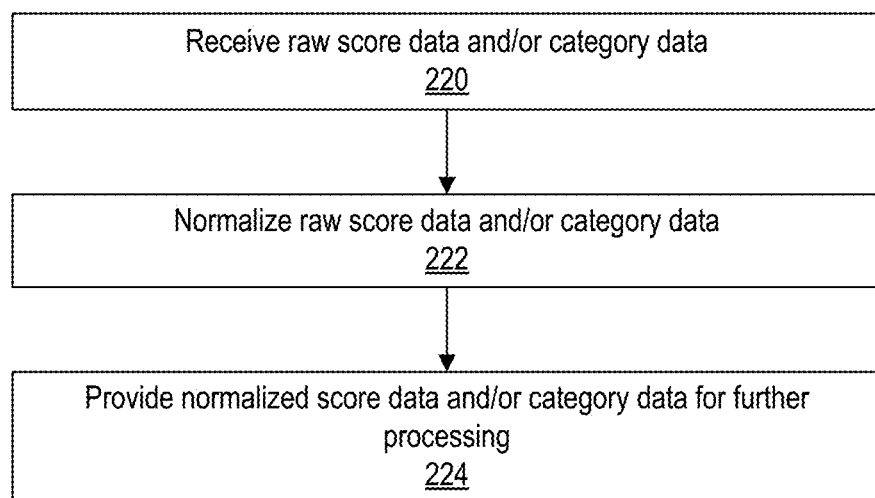
FIG. 2C depicts a flow diagram of an example process for normalization, according to implementations of the present disclosure.

FIG. 2C depicts a flow diagram of an example process for normalization, according to implementations of the present disclosure. Operations of the process can be performed by the normalization module 142, and/or other software module(s) executing on the platform or elsewhere.

Raw score data and/or category data is received (220). The raw score data and/or category data is normalized (222). The normalized score data and/or category data is provided for subsequent analysis and processing by the platform as described herein.

In some examples, normalization of score data can include modifying the score data to be within a consistent scale across various assessments, courses, and/or institutions. For example, in one course, a professor may score exam questions on a scale of 1 to 10, where 1 is minimum credit and 10 is maximum credit. In another course, a professor may score exam questions on a scale from 0 to 20, where 0 is minimum credit and 20 is maximum credit. Normalization of the score data can include adjusting each score to be within a consistent range (e.g., from 0 to 1). For example, if a raw data score was 5 on the scale from 0 to 20, the normalized score may be 0.25 on a scale from 0 to 1. Implementations can normalize score data to be within any suitable range of values. Normalization can also include applying a numeric score to raw data scores that were originally described more qualitatively. For example, raw data scores can be assigned to one of five qualitative values: "failing," "below average," "average," "above average," and "exceeds expectations." Normalization can transform these values to 0, 0.25, 0.5, 0.75, and 1.0 respectively, be within the range from 0 to 1.

Normalization of category data can include the mapping of input categories to a consistent set of categories that is applied across the assessment data from any number of assessment services. For example, one assessment service may provide assessment data that includes a category for "integral calculus," and another assessment service may provide assessment data that includes a category for "integrals." Normalization may place data that has been categorized into "integral calculus" and "integrals" respectively into a same normalized category "integration." Accordingly, the platform can analyze the semantic differences in categorization and impose a standard set of categories that can be consistently applied across assessment data from any number of sources.

The score data may also be correlated with target outcomes and/or categories to assess student performance on an assessment with respect to the various tested categories. For example, the platform may determine how well each student (or a class of students) performed on those questions that targeted the particular categories that correspond to particular target outcomes. In this way, the platform may determine how well a course did in teaching to its indicated target outcomes. This analysis also enables a more fine-grained assessment of student performance on outcomes. For example, the student may receive an overall grade in a calculus course, as well as grades or other performance evaluations in sub-topics corresponding to the outcomes and/or categories covered in the course.

As described above, in instances where the outcomes and categories are labeled inconsistently relative to each other, or inconsistently across multiple courses and/or assessments, the analysis engine 104 may determine a mapping that provides a consistent set of tags for use in describing the outcomes and categories. For example, an assessment may assess topics that were taught in multiple courses (e.g., for a board certification exam, licensing exam, comprehensive exam, etc.), and the analysis may employ the same set of tags across all the courses and for the assessment as well. Consistency in outcome and/or category tags enables evaluation of student performance and/or course quality over a whole education of multiple courses, not limited to a particular course.

In some implementations, the analysis may include determination of the quality of questions on one or more assessments. In such instances, the analysis engine may access psychometric data for the questions in an assessment, and use the data to evaluate question quality to determine whether questions may be improved. As described above, question quality may be determined based on a comparison of the point biserial of a question to the percentage of students who answered the question correctly.

In some implementations, the analysis may assess how students are performing on learning outcomes that are mapped with the categories used in the assessment(s). For example, if an accreditation agency requires particular outcomes for a student to be accredited or licensed for a particular profession or specialty, the system can map labels to the accreditation-relevant external outcomes, and assess coverage via the mapping (e.g., determine whether a student satisfied accreditation requirements).

For each course to be analyzed, the analysis engine may collect and analyze data from the course syllabus and/or other materials to determine the target outcomes to be covered by each course. The category data may be received from the assessment service, in the form of one or more exports of data sets per assessment administered by the assessment service. Such exports may include student scores on the assessments, as well as scores on individual questions of the assessments. The student score data may be anonymized, aggregated, and/or obfuscated to ensure privacy. The exported data sets may also include the categories for each question (e.g., as provided by the professor or automatically determined through NL analysis). The exports may also include psychometric data for questions. The categories are compared to the target outcomes for a course to determine the degree of coverage of the assessment, e.g., whether the assessed categories on the questions of the assessment correspond to the target outcomes.

Score data may be integrated with outcome data to determine student performance per outcome. The analysis may identify any gaps in coverage of the assessment. The analysis may also identify any gaps or deficiencies in student performance with respect to one or more particular outcomes, where such outcomes are assessed. The output reports may describe the analysis results for a particular assessment and/or for a course as a whole (e.g., including multiple assessments). Reports may indicate one or more of the following: gaps in coverage; whether the correct weight or proportion of learning outcomes is being tested; whether there are any unlabeled questions in an assessment (e.g., questions without any indicated categories); how students performed with respect to particular outcomes, where category data is available to make such a determination; the quality of questions, based on psychometric data; and/or score distributions for questions.

Reports can document everything that is provided in the dashboards along with the task fields and comments, or at least some portion thereof. Reports may also indicate how many students got a question correct or incorrect, and whether those who answered correctly or incorrectly are higher performers or lower performers in a student population. Such information may be used to infer question quality, by comparing the point biserial of a question to the percentage who answered the question correctly, as described above. For example, if students who answered a question correctly are primarily those who did poorly on the assessment, or are similar in proportion to those students who did well on the assessment, as indicated by the point biserial, that might indicate that the correctly answering students were guessing on the question, indicating a potentially low quality for the question. If percentage of students answering correctly correlates with those students who did well on the assessment, that may indicate a high-quality question. As described above, the course effectiveness dashboard may graphically present this comparison in a scatter plot, with question quality indicated by the position of the question in the scatter plot.

Reports may present assessment data in various forms. In some instances, a report may present a pie chart showing a percentage of learning outcomes per course and per assessment. A report may also present a correlation of a course, or an assessment, with the various categories of Bloom's taxonomy—a set of hierarchical models used to classify learning objectives into levels of complexity and/or specificity. For example, a knowledge-based (e.g., cognitive) model may include a hierarchy of remembering (e.g., a lowest level), comprehending, applying, analyzing, synthesizing, and evaluating (e.g., a highest level). The reports may evaluate based on criteria that higher level courses (e.g., advanced courses) should provide learning at a higher level in the hierarchy than lower-level courses (e.g., introductory courses). Questions on an assessment may be tagged with indication of the taxonomy level associated with the question, or taxonomy level may be determined automatically based on NL analysis. Courses, assessments, and/or particular questions may be evaluated with regard to whether they are assessing at the appropriate level in the taxonomy.

Figure 3:
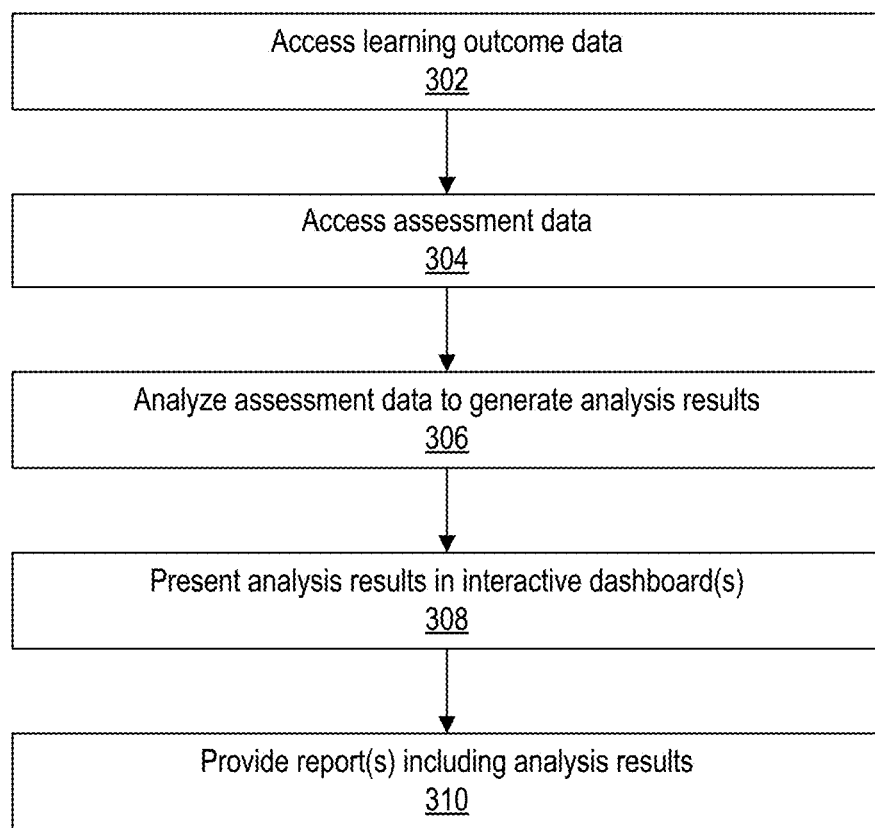
FIG. 3 depicts a flow diagram of an example process for assessment data analysis, according to implementations of the present disclosure.

FIG. 3 depicts a flow diagram of an example process for assessment data analysis, according to implementations of the present disclosure. Operations of the process may be performed by one or more of the analysis engine 104, reporting interface 120, the correlation module(s) 130, the gap analysis module(s) 132, the CQI integration 134, the interactive dashboard(s) 126, and/or other software executing on the analysis device(s) 102, the user device(s) 124, or elsewhere.

As described above, learning outcome data is accessed (302) and assessment data is accessed (304). The analysis results are generated (306) based on an analysis of the assessment data with respect to the outcome data. For example, a comparison of the outcome data and the category data may be performed to determine a degree of correlation between the target outcomes and the assessed categories for a course. Other assessments may also be performed based on score data, psychometric data, and/or other information as described above. The analysis results may be presented (308) through interactive dashboards, as described herein. The analysis results may also be provided (310) in one or more reports that are sent to report consumers and viewed on user devices.

In some implementations, the analysis results may be provided through interactive dashboards that allow a user to interactively query and refine the information that is being presented through the dashboards. FIGS. 4-10 depict examples of analysis results 118 and other information presented through dashboard(s), according to implementations of the present disclosure.

FIG. 4 provides an example of an item analysis scatter plot for evaluating questions. The x-axis tracks, for each question, a number or proportion of students who correctly answered the question. The y-axis tracks a point biserial for each question, indicating a correlation between correctly answering students and their level of performance (e.g., high performers on the test versus low performers). The location of each question on the scatter plot may indicate a quality of the question, e.g., whether a correct answer on the question correlates (e.g., high quality question) or does not correlate (e.g., low quality question) with high-performing students.

Figure 5:
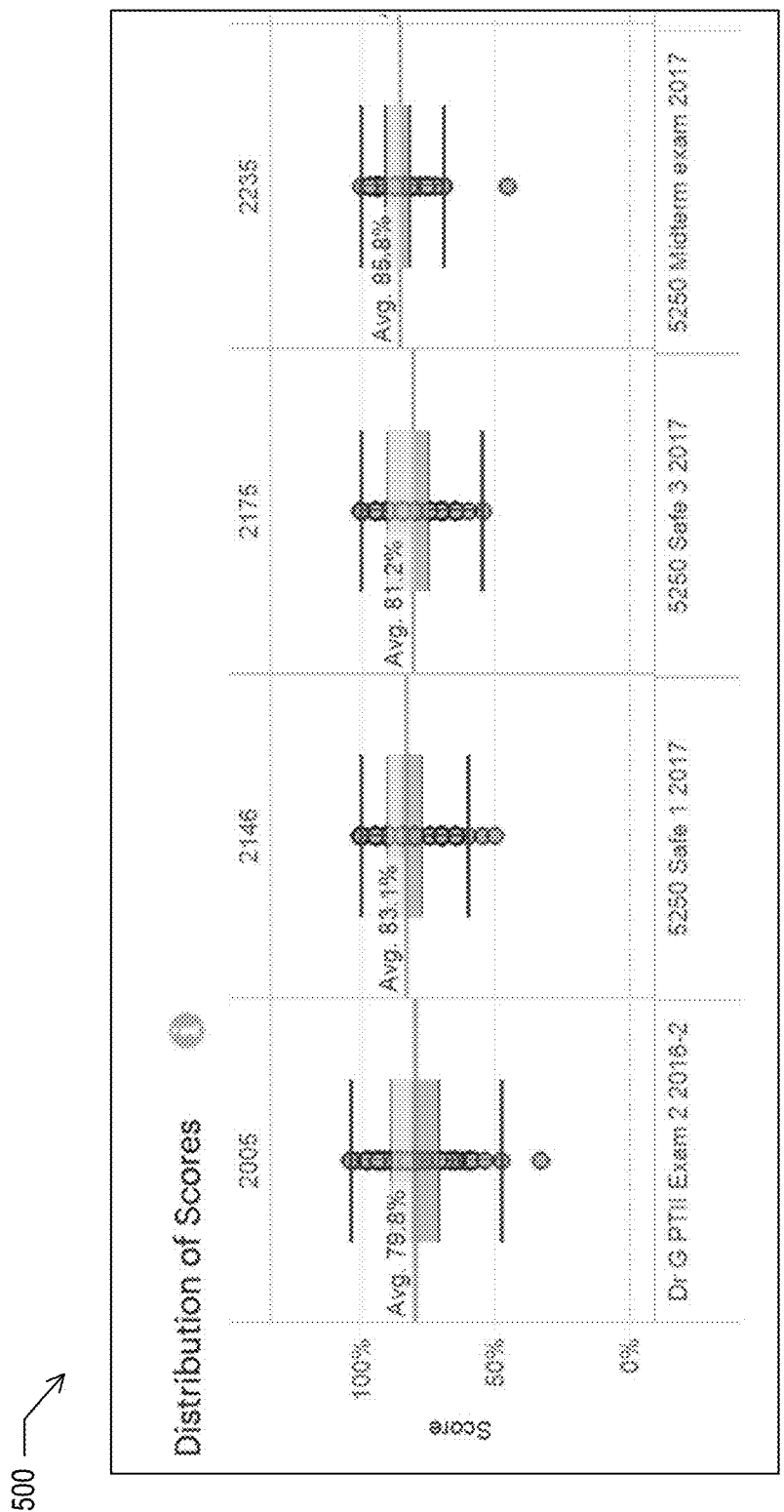

FIG. 5 provides an example of a chart that may be used to identify those students at risk of academic failure, based on the assessment output.

Figure 6:
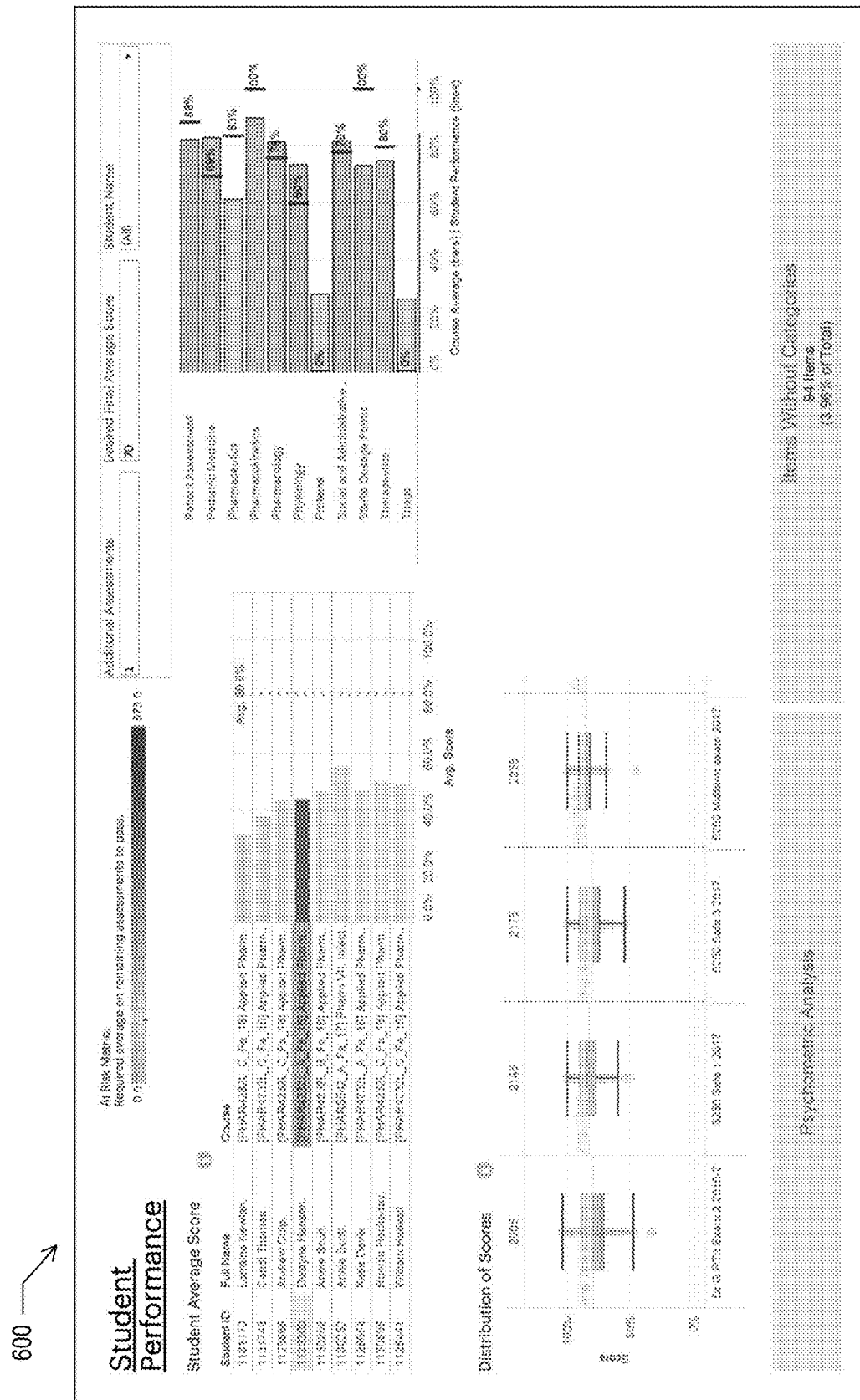

FIG. 6 provides an example of a chart indicating the level of student achievement with respect to target learning outcomes.

Figure 7:
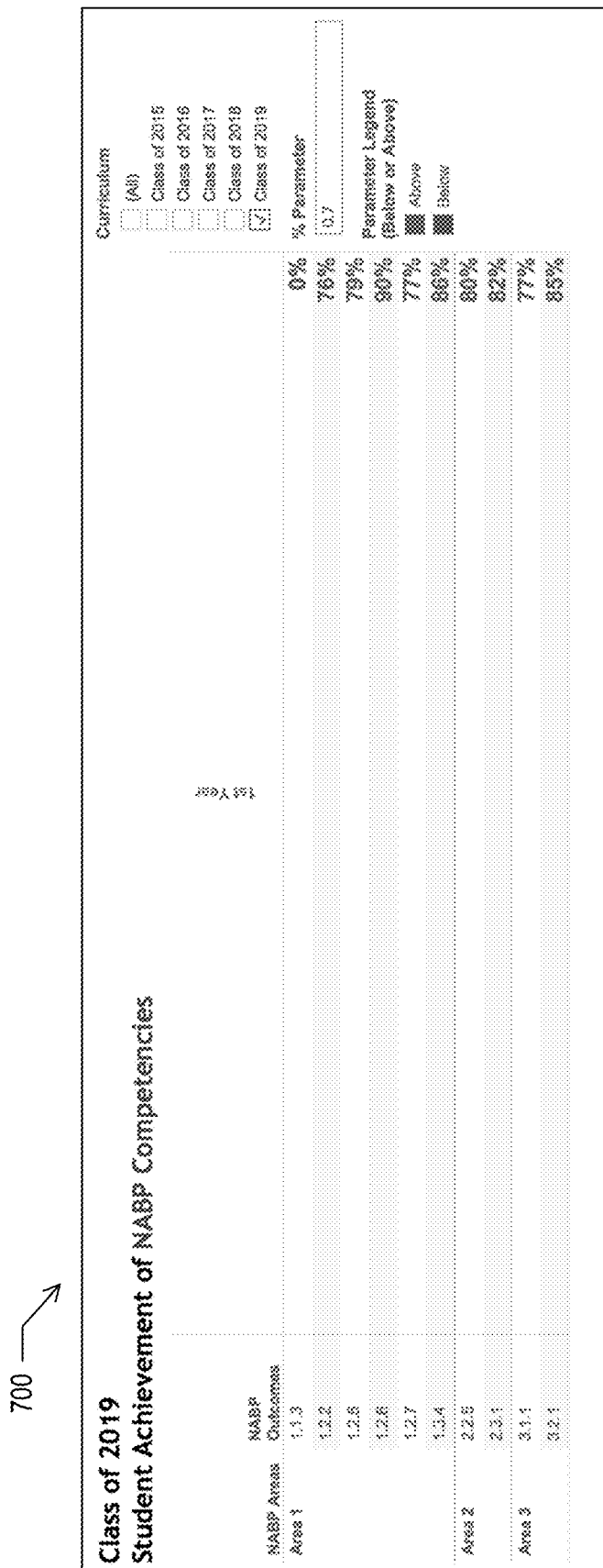

FIG. 7 provides an example of a chart indicating the level of student achievement with respect to learning outcomes for national competencies.

Figure 8:
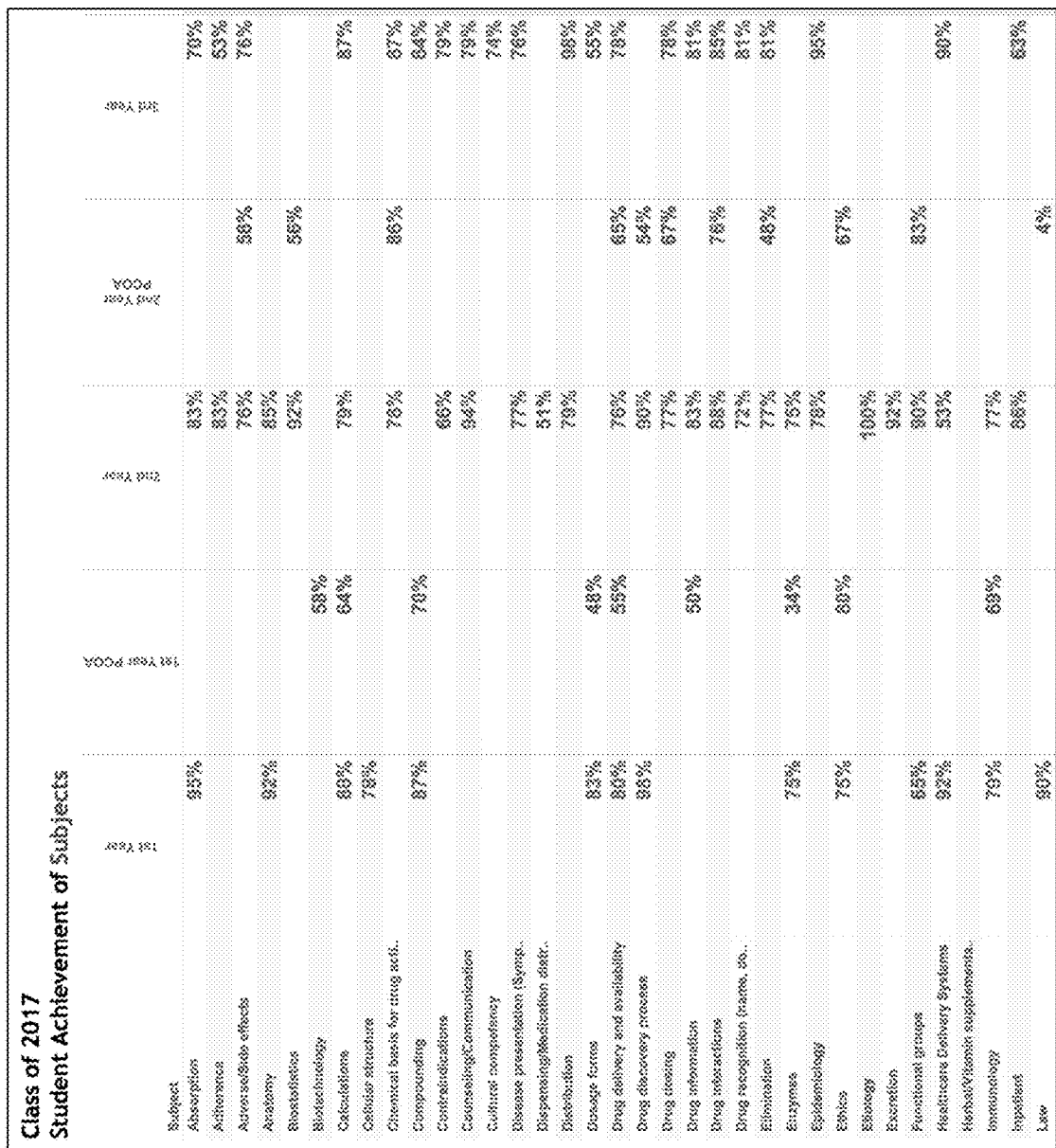

FIG. 8 provides an example of a chart indicating the level of student achievement on various target learning outcomes that are subjects in one or more courses.

Figure 9:
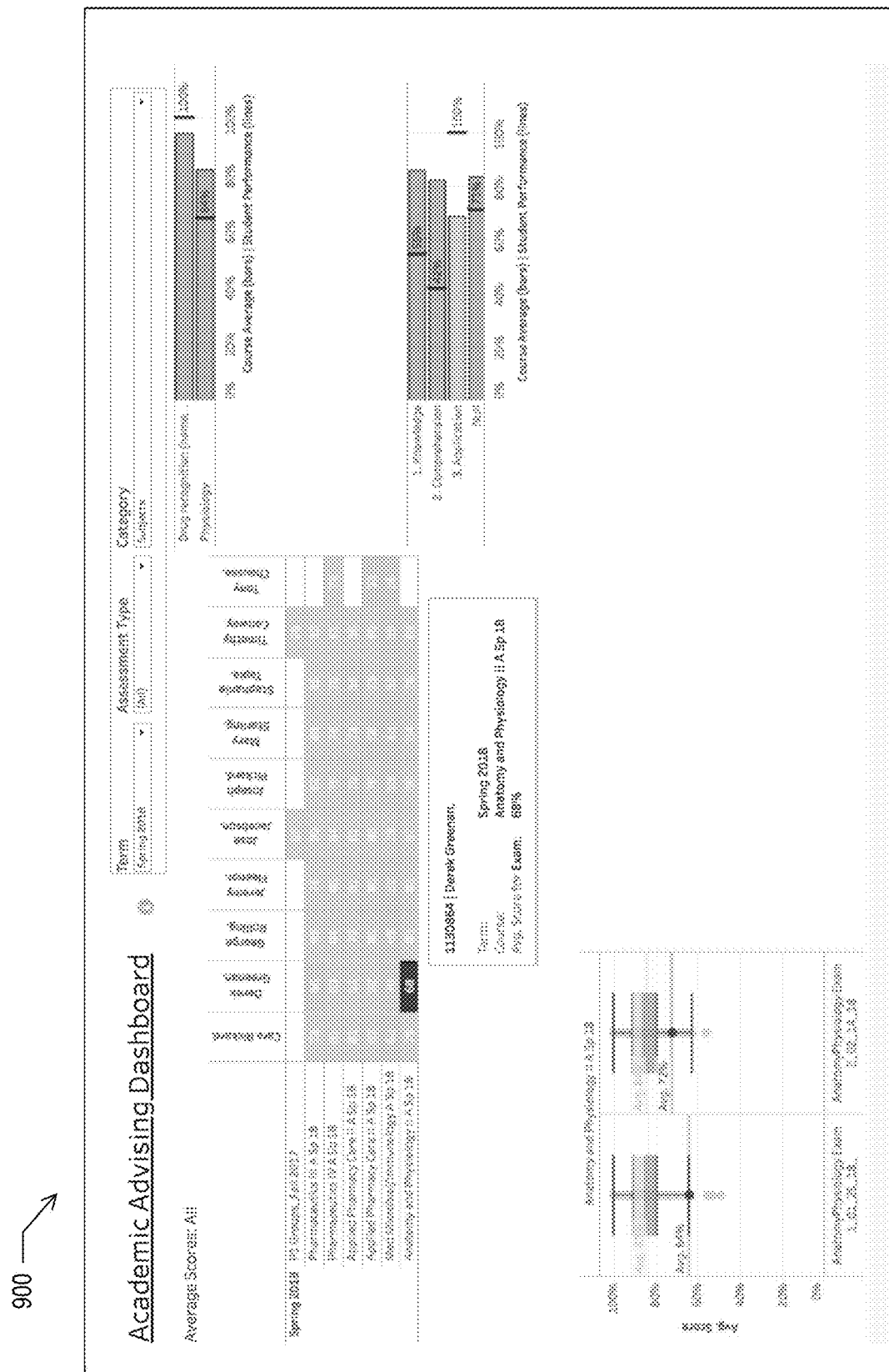

FIG. 9 provides an example of a student report card showing, for a particular student, their level of achievement with regard to particular outcomes, nationally tracked competencies, and subjects in course(s).

Figure 10:
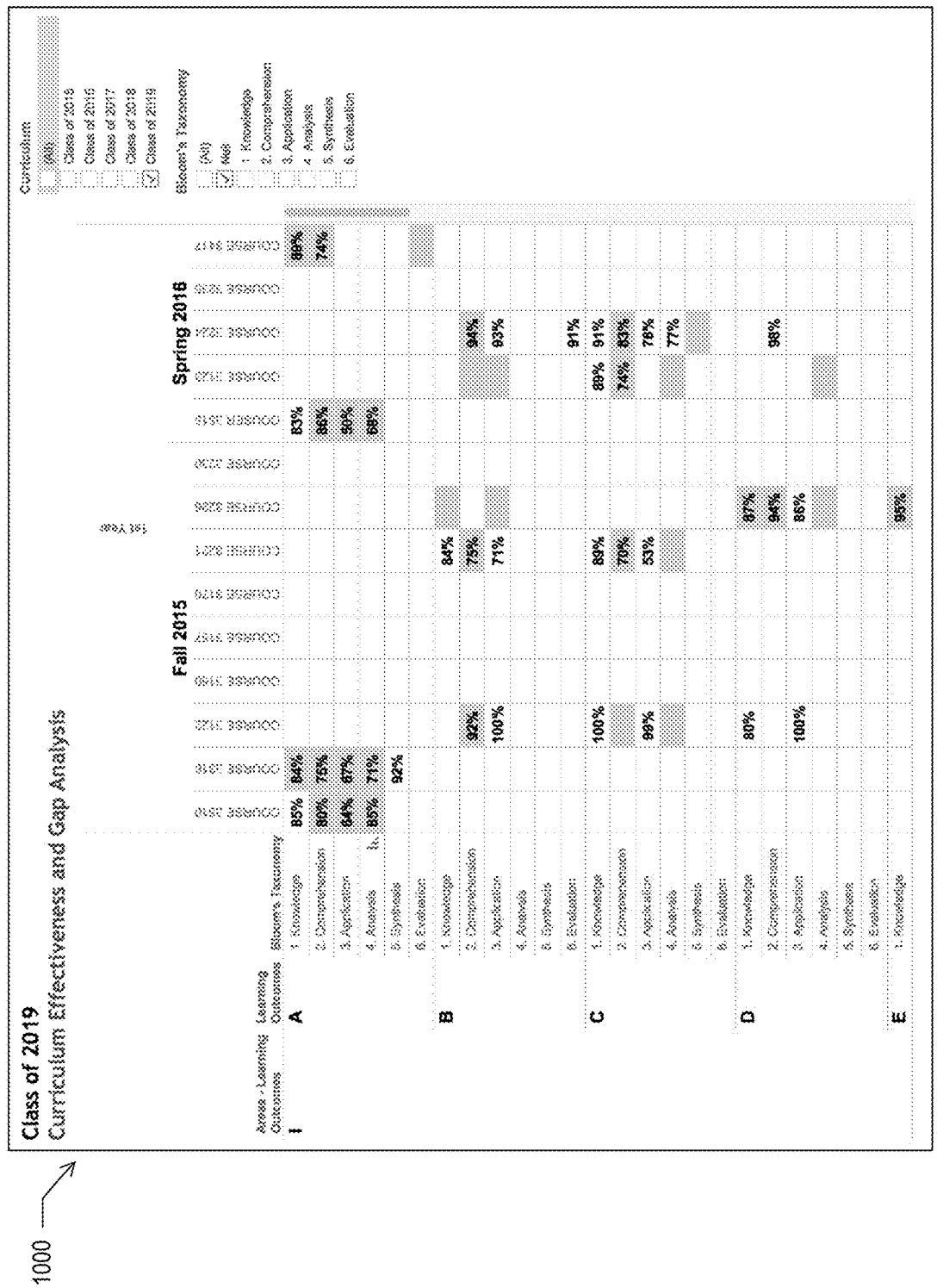

FIG. 10 provides an example of an analysis of curriculum gap and curriculum effectiveness, indicating a level of correspondence between tested categories and target course outcomes, as well as any gaps where the test(s) failed to assess performance with regard to any target outcomes of a course.

The U.S. Department of Education and various national agencies for the accreditation of programs in schools of health professions have established standards that are to be met or exceeded by the schools to ensure that graduates are prepared to enter practice. The schools are required to implement a plan to assess attainment of educational outcomes. The plan needs to measure student achievement at defined levels of the professional competencies that support attainment of the educational outcomes in aggregate and at the individual student level. Schools are also required to systematically assess the curricular structure, content, organization, and outcomes, and use assessment data for continuous improvement of the curriculum and its delivery. Traditionally, schools dedicate significant time and resources developing and planning assessments, with the aim of measuring and recording the results of desired outcomes. Less time is spent converting the data to generate actionable information and insights for programmatic assessment, accreditation compliance, and predictive analytics. Implementations described herein provide efficient and automatic academic assessment tools, and provide intuitive dashboards that show data insights for programmatic assessment and accreditation compliance. The system automatically integrates and analyzes data from disparate assessment systems, and employs predictive data science to anticipate specific actions to improve the quality of an educational program. The system helps students achieve educational outcomes and track their progress along the way, and helps educational institutions achieve and maintain compliance with accreditation standards by using real-time data. The system enables a program to identify which students are on track to pass their board certification or other exams, and which may need intervention and assistance.

Figure 11:
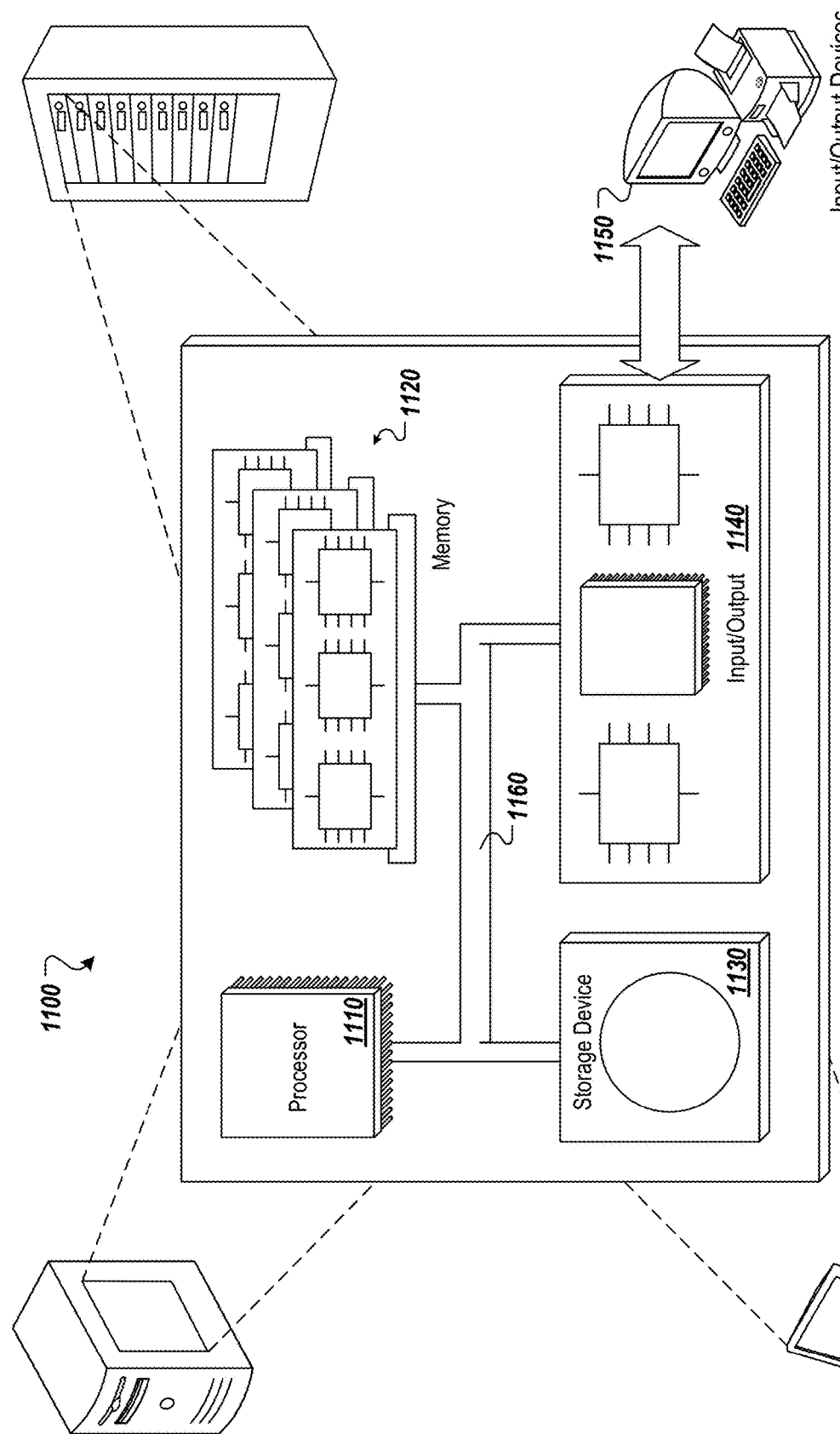
FIG. 11 depicts an example computing system, according to implementations of the present disclosure.

FIG. 11 depicts an example computing system, according to implementations of the present disclosure. The system 1100 may be used for any of the operations described with respect to the various implementations discussed herein. For example, the system 1100 may be included, at least in part, in one or more components of the system 100, such as the user device 124, the analysis device(s) 102, and/or other computing device(s) or computing system(s) described herein. The system 1100 may include one or more processors 1110, a memory 1120, one or more storage devices 1130, and one or more input/output (I/O) devices 1150 controllable via one or more I/O interfaces 1140. The various components 1110, 1120, 1130, 1140, or 1150 may be interconnected via at least one system bus 1160, which may enable the transfer of data between the various modules and components of the system 1100.

The processor(s) 1110 may be configured to process instructions for execution within the system 1100. The processor(s) 1110 may include single-threaded processor(s), multi-threaded processor(s), or both. The processor(s) 1110 may be configured to process instructions stored in the memory 1120 or on the storage device(s) 1130. For example, the processor(s) 1110 may execute instructions for the various software module(s) described herein. The processor(s) 1110 may include hardware-based processor(s) each including one or more cores. The processor(s) 1110 may include general purpose processor(s), special purpose processor(s), or both.

The memory 1120 may store information within the system 1100. In some implementations, the memory 1120 includes one or more computer-readable media. The memory 1120 may include any number of volatile memory units, any number of non-volatile memory units, or both volatile and non-volatile memory units. The memory 1120 may include read-only memory, random access memory, or both. In some examples, the memory 1120 may be employed as active or physical memory by one or more executing software modules.

The storage device(s) 1130 may be configured to provide (e.g., persistent) mass storage for the system 1100. In some implementations, the storage device(s) 1130 may include one or more computer-readable media. For example, the storage device(s) 1130 may include a floppy disk device, a hard disk device, an optical disk device, or a tape device. The storage device(s) 1130 may include read-only memory, random access memory, or both. The storage device(s) 1130 may include one or more of an internal hard drive, an external hard drive, or a removable drive.

One or both of the memory 1120 or the storage device(s) 1130 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 1100. In some implementations, the CRSM may include a data store that provides storage of computer-readable instructions or other information in a non-transitory format. The CRSM may be incorporated into the system 1100 or may be external with respect to the system 1100. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 1110 and the memory 1120 may be supplemented by, or incorporated into, one or more application-specific integrated circuits (ASICs).

The system 1100 may include one or more I/O devices 1150. The I/O device(s) 1150 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 1150 may also include one or more output devices such as a display, LED(s), an audio output device (e.g., a speaker), a printer, a haptic output device, and so forth. The I/O device(s) 1150 may be physically incorporated in one or more computing devices of the system 1100, or may be external with respect to one or more computing devices of the system 1100.

The system 1100 may include one or more I/O interfaces 1140 to enable components or modules of the system 1100 to control, interface with, or otherwise communicate with the I/O device(s) 1150. The I/O interface(s) 1140 may enable information to be transferred in or out of the system 1100, or between components of the system 1100, through serial communication, parallel communication, or other types of communication. For example, the I/O interface(s) 1140 may comply with a version of the RS-232 standard for serial ports, or with a version of the IEEE 1284 standard for parallel ports. As another example, the I/O interface(s) 1140 may be configured to provide a connection over Universal Serial Bus (USB) or Ethernet. In some examples, the I/O interface(s) 1140 may be configured to provide a serial connection that is compliant with a version of the IEEE 1394 standard.

The I/O interface(s) 1140 may also include one or more network interfaces that enable communications between computing devices in the system 1100, or between the system 1100 and other network-connected computing systems. The network interface(s) may include one or more network interface controllers (NICs) or other types of transceiver devices configured to send and receive communications over one or more communication networks using any network protocol.

Computing devices of the system 1100 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 1100 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method performed by a platform executed by one or more computing devices, the method comprising:
 a computer server receiving an electronic transmission of assessment data from at least one external assessment service;
 the assessment data comprising at least one assessment having at least one respective question, category data describing at least one category associated with each respective question of the at least one assessment, score data describing a plurality of original scores based on a response of an individual to the at least one respective question on the at least one assessment;
 the computer server normalizing the assessment data wherein the original scores are assigned a normalized score based on a uniform scoring scale;
 the computer server receiving an electronic transmission of outcome data indicating at least one outcome associated with at least one course that includes the at least one assessment;
 the computer server analyzing the assessment data and the outcome data to determine analysis results, including comparing the outcome data to the category data to identify at least one gap in coverage of the outcome data by the at least one assessment;
 the computer server electronically transmitting the analysis results, including the at least one identified gap, through at least one interactive dashboard accessible via a user computing device;
 receiving, by the platform, accreditation information describing one or more accreditation criteria;
 comparing, by the platform, the accreditation information to the outcome data;
 determining, by the platform, based on the comparing, the at least one gap that identifies at least one discrepancy between the one or more accreditation criteria and the at least one outcome; and
 wherein the platform comprises an analysis engine having a plurality of modules, the at least one interactive dashboard through which the analysis results are presented, and a reporting interface, said platform, said analysis engine, said plurality of modules, said at least one interactive dashboard, and said reporting interface comprising a medium through which the receiving, normalizing, receiving, analyzing and presenting steps occur.

2. The method of claim 1, wherein the at least one gap identifies at least one question that is not associated with at least one category in the assessment data.

3. The method of claim 1, wherein the at least one gap identifies at least one outcome for which none of the questions on the at least one assessment is associated with a category corresponding to the at least one outcome.

4. The method of claim 1, wherein the at least one gap identifies a discrepancy between distribution weights of outcomes associated with a course compared to distribution weights of categories associated with at least one assessment included in the course.

5. The method of claim 1, further comprising:
 generating, by the platform, at least one report that describes on or more accreditation criteria that are satisfied by the outcome data; and
 communicating, by the platform, the at least one report to an entity that provided the accreditation information.

6. The method of claim 1, wherein:
 the outcome data includes a first set of metadata tags that describe the at least outcome for the at least one course;
 the category data includes a second set of metadata tags that describe the at least one category associated with questions included in the at least one assessment; and
 analyzing the assessment data and the outcome data includes determining a mapping between each of the first set of metadata tags and one or more corresponding tags included in the second set of metadata tags.

7. The method of claim 1, wherein:
 the outcome data includes at least one syllabus of the at least one course; and
 analyzing the outcome data includes performing a natural language analysis of at least one syllabus to determine the at least one outcome associated with the at least one course.

8. A system comprising:
 at least one processor; and
 a memory communicatively coupled to the processor, the memory storing instructions which, when executed by the at least one processor, instruct the at least one processor to perform operations comprising:
 receiving an electronic transmission of assessment data from at least one external assessment service;

the assessment data comprising at least one assessment having at least one respective question, category data describing at least one category associated with each respective question of the at least one assessment, score data describing a plurality of scores each assigned based on a response of an individual to the at least one respective question on the at least one assessment;

normalizing the assessment data wherein the original scores are assigned a normalized score based on a uniform scoring scale;

receiving an electronic transmission of outcome data indicating at least one outcome associated with at least one course that includes the at least one assessment;

analyzing the assessment data and the outcome data to determine analysis results, including comparing the outcome data to the category data to identify at least one gap in coverage of the outcome data by the at least one assessment;

electronically transmitting the analysis results, including the at least one identified gap, through at least one interactive dashboard;

receiving, by a platform, accreditation information describing one or more accreditation criteria;

comparing, by the platform, the accreditation information to the outcome data;

determining, by the platform, based on the comparing, the at least one gap that identifies at least one discrepancy between the one or more accreditation criteria and the at least one outcome; and wherein the platform comprises an analysis engine having a plurality of modules, the at least one interactive dashboard through which the analysis results are presented, and a reporting interface, said platform, said analysis engine, said plurality of modules, said at least one interactive dashboard, and said reporting interface comprising a medium through which the receiving, normalizing, receiving, analyzing and presenting steps occur.

9. The system of claim 8, wherein the at least one gap identifies at least one question that is not associated with at least one category in the assessment data.

10. The system of claim 8, wherein the at least one gap identifies at least one outcome for which none of the questions on the at least one assessment is associated with a category corresponding to the at least one outcome.

11. The system of claim 8, wherein the at least one gap identifies a discrepancy between distribution weights of outcomes associated with a course compared to distribution weights of categories associated with at least one assessment included in the course.

12. The system of claim 8, the operations further comprising:
generating, by the platform, at least one report that describes on or more accreditation criteria that are satisfied by the outcome data; and
communicating, by the platform, the at least one report to an entity that provided the accreditation information.

13. The system of claim 8, wherein:
the outcome data includes a first set of metadata tags that describe the at least outcome for the at least one course;
the category data includes a second set of metadata tags that describe the at least one category associated with questions included in the at least one assessment; and
analyzing the assessment data and the outcome data includes determining a mapping between each of the first set of metadata tags and one or more corresponding tags included in the second set of metadata tags.

14. The system of claim 8, wherein:
the outcome data includes at least one syllabus of the at least one course; and
analyzing the outcome data includes performing a natural language analysis of at least one syllabus to determine the at least one outcome associated with the at least one course.

15. One or more non-transitory computer-readable storage media storing instructions which, when executed, cause at least one processor to perform operations comprising:
receiving an electronic transmission of assessment data from at least one external assessment service;
the assessment data comprising at least one assessment having at least one respective question, category data describing at least one category associated with each respective question of the at least one assessment, score data describing a plurality of scores each assigned based on a response of an individual to a question on the at least one assessment;
receiving an electronic transmission of outcome data indicating at least one outcome associated with at least one course that includes the at least one assessment;
analyzing, by a platform, the assessment data and the outcome data to create analysis results,
the analysis results including comparing the outcome data to the category data to identify at least one gap in coverage of the outcome data by the at least one assessment; and
electronically transmitting the analysis results, including the at least one identified gap, to at least one interactive dashboard accessible via a user computing device;
receiving, by the platform, accreditation information describing one or more accreditation criteria;
comparing, by the platform, the accreditation information to the outcome data;
determining, by the platform, based on the comparing, the at least one gap that identifies at least one discrepancy between the one or more accreditation criteria and the at least one outcome; and
wherein the platform comprises an analysis engine having a plurality of modules, the at least one interactive dashboard through which the analysis results are presented, and a reporting interface, said platform, said analysis engine, said plurality of modules, said at least one interactive dashboard, and said reporting interface comprising a medium through which the receiving, normalizing, analyzing and presenting steps occur.

16. The one or more non-transitory computer-readable storage media of claim 15, the operations further comprising:
normalizing, by the platform, the assessment data to provide a same range of scores for a plurality of questions described in the assessment data.

* * * * *